United States Patent [19]

Matsuda et al.

[11] Patent Number: 5,361,163
[45] Date of Patent: Nov. 1, 1994

[54] REFLECTION TYPE PROJECTION SCREEN, PRODUCTION PROCESS THEREOF, AND PRODUCTION APPARATUS THEREOF

[75] Inventors: Noriaki Matsuda; Keiji Hanamoto, both of Tokyo, Japan

[73] Assignee: Dai Nippon Printing Co., Ltd., Tokyo, Japan

[21] Appl. No.: 155,660

[22] PCT Filed: Jun. 3, 1992

[86] PCT No.: PCT/JP92/00715

§ 371 Date: Apr. 2, 1993

§ 102(e) Date: Apr. 2, 1993

[87] PCT Pub. No.: WO92/22009

PCT Pub. Date: Oct. 12, 1992

Related U.S. Application Data

[63] Continuation of Ser. No. 972,451, Apr. 2, 1993, abandoned.

[30] Foreign Application Priority Data

| Jun. 3, 1991 | [JP] | Japan | 3-131398 |
| Jun. 14, 1991 | [JP] | Japan | 3-143480 |
| Aug. 6, 1991 | [JP] | Japan | 3-196763 |
| Feb. 10, 1992 | [JP] | Japan | 4-24094 |
| Apr. 16, 1992 | [JP] | Japan | 4-96376 |

[51] Int. Cl.⁵ ............................................. G03B 21/56
[52] U.S. Cl. ............................. 359/452; 264/1.9; 359/459
[58] Field of Search ............... 359/443, 452, 459; 428/141; 264/1.7, 1.9

[56] References Cited

U.S. PATENT DOCUMENTS

| 2,928,131 | 3/1960 | Mahler | 264/1.7 |
| 4,140,369 | 2/1979 | Howland | 359/452 |
| 4,165,153 | 8/1979 | Land | 359/452 |
| 4,354,738 | 10/1982 | Forehand et al. | 359/452 |

FOREIGN PATENT DOCUMENTS

| 89124 | 6/1933 | Japan . |
| 6346 | 4/1960 | Japan . |
| 49-90533 | 8/1974 | Japan . |
| 58-178341 | 10/1983 | Japan . |
| 61-21133 | 5/1986 | Japan . |
| 62-164329 | 10/1987 | Japan . |

Primary Examiner—Richard A. Wintercorn
Attorney, Agent, or Firm—Wegner, Cantor, Mueller & Player

[57] ABSTRACT

A reflection type projection screen is constituted as follows. Provided in order on a light absorbing layer 5, which is a dark plastic sheet or a solid print of a dark ink, are a fibrous sheet 4 of glass fibers, a white, opaque base material sheet 3 made with a plastic sheet, and a light diffusing layer 2 of a translucent plastic into which a lustrous pigment or calcite powder is incorporated. An emboss 9 is formed on the outer surface of the light diffusing layer 1. It is preferable that a reflection layer 2 printed with an ink containing a lustrous pigment or calcite powder is provided below the light diffusing layer 1. Light absorbing stripes 11 are provided each at a position corresponding to a concave portion 9a of the emboss 9 on the surface of the base material sheet 3 adjoining the light diffusing layer 1. A production process and a production apparatus of a reflection type screen, which can efficiently produce reflection type screens with the emboss are also disclosed.

38 Claims, 15 Drawing Sheets

REFLECTION TYPE PROJECTION SCREEN, PRODUCTION PROCESS THEREOF, AND PRODUCTION APPARATUS THEREOF

This application is a continuation of U.S. application Ser. No. 07/972,451 filed Apr. 2, 1993 now abandoned.

TECHNICAL FIELD

The present invention relates to projection screens, specifically a reflection type screen for projecting thereon a moving picture such as a motion picture, to a production process thereof, and to a production apparatus thereof.

BACKGROUND ART

A screen used for projection of a slide or OHP, or, for projection of a movie or video is generally a lamination of a dark backing sheet and a white polyvinyl chloride (PVC) film. Conventional screens have low reflectivities and therefore dark projected images, so that the projected images cannot be watched except in a dark room. In addition, the conventional screens have low diffusing powers, so that the projected images cannot be watched except within a limited range of angle to the screen surface.

There is a screen in which glass beads are bonded to the PVC film to enhance the reflectivity and the diffusing power. Such a screen, however, has unevenness on its surface and is easily contaminated. Therefore, the glass beads are readily scraped off when the contaminants are wiped off from the surface thereof, which is a defect of such a screen. If such a screen is used as a screen of wind-up type, the glass beads will gradually drop off while the screen is wound and unwound many times, which is also a problem.

There is proposed ( in Japanese Laid-open Utility Model Publication No. Sho 64-40835) a screen comprising the dark backing sheet and the white PVC film as described above, in which a metallized layer is provided as a reflection layer on the white PVC film, in which a translucent PVC film containing a pearl pigment is laminated thereon, and in which a specific emboss is provided on the outer surface thereof.

A screen having a reflection layer of metal has a too high light reflectivity and too many components of specular reflection (where incidence angle = reflection angle), so that a halation is caused to present a dull image projected. In addition, while a plastic sheet (mainly a polyester sheet) must be used with a strong adhesivity to the metallized layer in order to form the metallized layer as a reflection layer, there is a defect in that such a plastic sheet is likely to have creases. In other words, there remain folds caused upon transfer or wind-up of the screen, and the high reflectivity makes the folds outstanding. These problems are serious if a screen should be of a big picture plane, for example, of 100 inches.

DISCLOSURE OF THE INVENTION

It is a first object of the present invention to provide a reflection type screen having a diffusing power and a reflectivity suitable for a projection screen, which is free of creases and easy in handling.

It is a second object of the present invention to provide a reflection type projection screen which has high contrast even in a bright place to secure a clear image while restraining disturbance of stray lights.

It is a third object of the present invention to provide a reflection type projection screen which, solving the problems as described, provides a beautiful image and can enhance a sound effect.

It is a fourth object of the present invention to provide a reflection type projection screen which can always assure a clear image, solving the above-mentioned problems.

It is a fifth object of the present invention to provide a process for producing a reflection type projection screen having desired optical properties, which is advantageous in productivity in an industrial application.

It is a sixth object of the present invention to provide a process for readily producing a reflection type projection screen having an emboss and light absorbing stripes.

(1) A first feature of the present invention is a reflection type projection screen provided in order with a light absorbing layer of a dark plastic sheet, a fibrous sheet of glass fibers, a base material sheet of a white, opaque, flexible plastic, and a light diffusing layer of a translucent, flexible plastic into which a lustrous pigment or calcite powder is incorporated, wherein a convexo-concave emboss is formed on the outer surface of the light diffusing layer (1).

(2) A second feature of the present invention is a reflection type projection screen provided in order with a base material whose both faces are dark, and a light diffusing layer made with a translucent plastic sheet into which a scaly lustrous pigment is incorporated.

(3) A third feature of the present invention is a reflection type projection screen provided in order with a light absorbing layer of a dark plastic sheet, at least one of a fibrous sheet with flexibility and a base plate with stiffness, a base material sheet of a white, opaque, flexible plastic, a reflection layer printed with an ink containing a lustrous pigment or calcite powder, and a light diffusing layer of a translucent, flexible plastic containing a lustrous pigment or calcite powder, wherein a convexo-concave emboss is provided on the outer surface of the light diffusing layer and wherein a number of small openings are provided at least at a position of a speaker located behind the light absorbing layer, through which openings sounds may pass from the speaker.

(4) A fourth feature of the present invention is a reflection type projection screen provided in order with a light absorbing layer of a dark plastic sheet, at least one of a fibrous sheet with flexibility and a base plate with stiffness, a base material sheet of a white, opaque, flexible plastic, a reflection layer printed with an ink containing a lustrous pigment or calcite powder, and a light diffusing layer of a translucent, flexible plastic containing a lustrous pigment or calcite powder, wherein a convexo-concave emboss is provided on the outer surface of the light diffusing layer (301) and wherein the convexo-concave pattern of the emboss has either no periodicity or a periodicity with a periodic direction of the convexo-concave pattern inclined at an angle of 15–75 degrees to a direction of arrangement of projection pixels.

(5) A fifth feature of the present invention is a process for producing a reflection type screen, comprising:

rotating a rotary intaglio with a surface having a fine convexo-concave pattern in lens form, filling at least recess portions of the rotary intaglio with an ionizing radiation curing resin liquid, and pressing against the rotary intaglio a support sheet of a transparent, flexible plastic traveling in the rotation direction of the rotary intaglio in synchronism therewith;

rotating the rotary intaglio so as to keep the support sheet in contact with the rotary intaglio, and irradiating said ionizing radiation curing resin liquid with an ionizing radiation to cure the resin liquid and simultaneously to effect adhesion between the cured resin layer and the support sheet, separating the support sheet together with the cured resin layer from the rotary intaglio to thereby make a lens sheet in which a fine convexo-concave cured resin layer in lens form is formed on one face of the support sheet; and laminating a backing base material with light diffusing and reflecting properties on the non-lens face of the lens sheet.

(6) A sixth feature of the present invention is a process for producing a reflection type screen, comprising:

printing light absorbing stripes with a light absorbing ink on one face of a support sheet of a transparent, flexible plastic;

rotating a rotary intaglio with a surface having a fine convexo-concave pattern in lens form, filling at least recess portions of the rotary intaglio with an ionizing radiation curing resin liquid, letting the support sheet travel in the rotation direction of the rotary intaglio in synchronism therewith, and pressing the other face of the support sheet against said rotary intaglio;

rotating the rotary intaglio so as to keep the support sheet in contact with the rotary intaglio, and irradiating the ionizing radiation curing resin with an ionizing radiation to cure said curing resin and simultaneously to effect adhesion between the cured resin layer and the support sheet;

separating the support sheet together with the cured resin layer from the rotary intaglio, printing light absorbing stripes on one face of the support sheet, and producing a lens sheet provided with the cured resin layer having a convexo-concave lens surface in which a recess portion is located at a position corresponding to each light absorbing stripe; and laminating a backing base material with light diffusing and reflecting properties on the face of the lens sheet adjoining the light absorbing stripes.

BEST MODES FOR CARRYING OUT THE INVENTION

§1 First Embodiment of Reflection Type Projection Screen

1.1 Fundamental Constitution

A first embodiment of a reflection type projection screen according to the present invention will now be described with reference to FIGS. 1 to 5.

Figure 1:
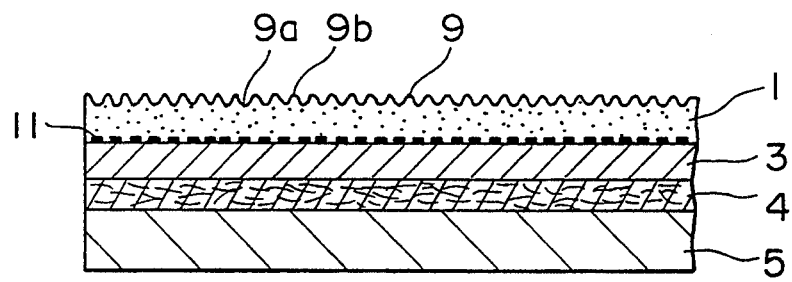
FIG. 1 is a sectional side view showing a first embodiment of a reflection type projection screen according to the present invention.

The first embodiment of the reflection type projection screen according to the present invention, as seen in FIG. 1 to show a cross section thereof, is provided in order on a light absorbing layer 5 of a dark plastic sheet with a fibrous sheet 4 of glass fibers, a base material sheet 3 of a white, opaque, flexible plastic, and a light diffusing layer 1 of a translucent, flexible plastic into which a lustrous pigment or calcite powders are incorporated, in which a corrugated or convexo-concave emboss 9 is provided on the outer surface of the light diffusing layer 1.

Figure 2:
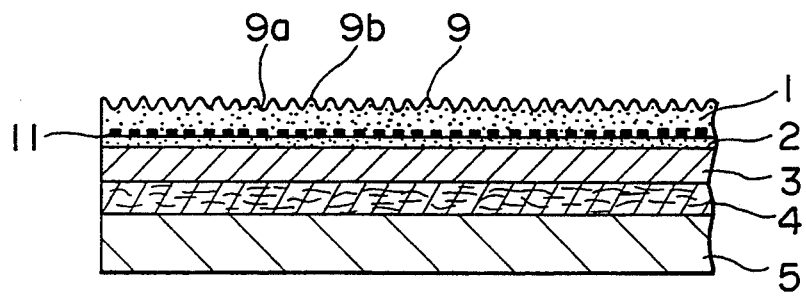
FIG. 2 is a sectional side view showing a modification of the reflection type projection screen as shown in FIG. 1.

A modification embodiment of the above is a reflection type projection screen as shown in FIG. 2. In detail, it is provided in order on a light absorbing layer 5 of a dark plastic sheet with a fibrous sheet 4 of glass fibers, a base material sheet 3 of a white, opaque, flexible plastic, a reflection layer 2 printed with an ink containing a lustrous pigment or calcite powders, and a light diffusing layer 1 of a translucent, flexible plastic into which a lustrous pigment or calcite powders are incorporated, in which an emboss 9 is provided on a surface of the light diffusing layer 1.

The plastics used for the base material sheet 3 and for the light diffusing layer 1 are any of flexible plastics, for example, specifically a polyvinyl chloride, suitably a polypropylene and a polyethylene. Particularly preferable is a soft material in which a plasticizer is added by 50-60 parts by weight to 100 parts by weight of polyvinyl chloride. The thickness of the base material sheet 3 is preferably between 0.05 and 1 mm.

Usable as the base material sheet 3 is a sheet formed by kneading a white pigment and a lustrous pigment in a plastic. It is, however, difficult to obtain a large quantity of coarse grains of lustrous pigment uniformly dispersed in a plastic. Also, it is not advantageous to use a large quantity of expensive lustrous pigment. Further, such a sheet has a low flexibility. Therefore, it is advantageous to print the ink containing the lustrous pigment on the sheet formed by kneading only a white pigment therein.

Examples are listed as follows for the lustrous pigment which may be incorporated into the light diffusing layer 1 and the reflection layer 2: (a) materials called pearl pigments, specifically, ground inside portion of seashells, ground pearl, mica, finely divided particles of mica with $TiO_2$ or ion oxide baked thereon; (b) metal powders, specifically, copper, aluminum, brass, bronze, gold, silver, preferably, of finely divided particles of 1-120 $\mu$m; (c) splinters of deposited plastic film, for example a material obtained by depositing a metal as listed above, normally aluminum, onto a polyethylene terephthalate film and grinding it. The lustrous pigment is preferably scaly in shape. Arranging surfaces of scaly bodies of the lustrous pigment in parallel with a plane of the base material sheet enhances irregular reflection of high luminance.

The powder of calcite incorporated into the light diffusing layer 1 and the reflection layer 2 preferably has an average grain size of 2-20 $\mu$m, and preferably has a size distribution as narrow as possible. For example in case of an average grain size of 5 $\mu$m, a preferable size distribution is such that more than 80% by weight drop in a range between 3 and 7 $\mu$m.

The amount of the lustrous pigment or the calcite powder added into the plastic for the light diffusing layer 1 is between 0.5 and 10% by weight, specifically preferably about 2% by weight.

The ink printed on the base material sheet 3 to form the reflection layer 2 is an ink in which a lustrous pigment or calcite powder is dispersed in a normal ink vehicle. Examples of the vehicle are polyvinyl chlorides, polyvinyl chloride-polyvinyl acetate copolymers, acrylic resins, polyurethanes, and polyesters. Although it is preferable that the proportion of the lustrous pigment in the ink be as high as possible, an excessively low ratio of the vehicle makes the formation of the print layer on the base material sheet difficult. Thus, a preferable composition of the ink is 5–50 parts by weight of the vehicle to 100 parts by weight of the pigment. The thickness to be coated by printing is ordinarily about 1–10 $\mu$m.

Such an ink into which coarse grains of lustrous pigment are dispersed tends to cause unevenness upon printing. Obtaining a desired thickness by a single printing should be avoided. A lap printing is preferable to obtain a desired thicknesses of layers by repeating a printing of fractional thickness several times, obtaining a high reflection power of the light diffusing layer 1.

In the case of use of the calcite powder, a preferable composition of the ink is defined by the same reasoning as above such that 10–100 parts by weight, specifically 10–50 parts by weight, of the vehicle are added to 100 parts by weight of the calcite powder.

The printing to form the reflection layer 2 may be carried out by any one of known techniques such as printing methods of the gravure process, the silk screen process, and the like, and coating methods such as the spray coating, the roll coating, and the like. A sufficient thickness of the print layer is 1 $\mu$m or more in a dry state.

An appropriate thickness of the light diffusing layer 1 is between 0.04 and 0.8 mm in the case of no provision of the reflection layer 2, based on a consideration to reduce an attenuation amount of reflected light to keep projected images bright enough. In the case of provision of the reflection layer 2, the attenuation of reflected light amount is low, and, therefore, an appropriate thickness is between 0.05 and 1 mm in view of broadening a half-value angle by increasing the thickness of the light diffusing layer.

The fibrous sheet 4 is for enhancing the dimensional stability of the screen. Specifically, when the screen is used as a wind-up screen, the base screen is required to prevent the screen pulled down from sagging. Also, when the screen wound up for storage is again unwound in use for projection, a remaining curling causes a projected image to be warped. Thus, the fibrous sheet 4 is required to have a sufficient elastic recovery and a sufficient stiffness. Materials to meet these requirements are a woven fabric or an unwoven fabric of glass fibers, a plastic sheet such as a polyester and a cellulose triacetate which is given a flexibility with many small pores.

The plastic sheet for the light absorbing layer 5 is made by incorporating a dark, for example black, dark brown, or dark blue, pigment into a plastic material as used for the base material sheet and by forming it. The screen is preferably balanced in a direction of thickness, if a thickness of the sheet is set substantially equal to the total thickness of the base material sheet 3 and the light diffusing layer 1 or to the total thickness of the base material sheet 3, the reflection layer 2, and the light diffusing layer 1.

The above-described screen can be produced by heating and pressing for unification the plastic sheet for the light absorbing layer 5, the light diffusing layer 1 or a lamination of the reflection layer 2 and the light diffusing layer 1, and the fibrous sheet 4 of glass fibers sandwiched between the foregoing elements, and by simultaneously imparting an emboss on the surface of the diffusing layer. The unification may be effected by either of the fusion bonding method and the dry lamination method.

The lamination of the base material sheet 3 and the light diffusing layer 1 can be made by laminating the plastic sheet for the light diffusing layer 1 on the base material sheet 3 (or on the reflection layer 2 if it is provided), or, by coating a sol of the plastic for the light diffusing layer thereon.

A pattern of the convexo-concave emboss 9 may be a pattern in which waves intersect each other at 90 degrees, which is frequently used in conventional reflection type screens. The pattern may be also arbitrarily chosen from those of a fly eye lens group, a graining look, a hairline look, etc. In the case where the audience spreads right and left as well as in front of the screen, the light should be diffused horizontally at a large half-value angle. For this purpose, an emboss is preferable with a semitubular lenticular lens group with axes thereof being vertical.

Further, as shown in FIG. 1, light absorbing stripes 11 are provided on the surface of the base material sheet 3 on the side of the light diffusing layer 1 at locations other than areas on which the projection light is converged and projected (normally at positions corresponding to concave portions 9a of the emboss 9, because the projection light enters the projection screen in a direction close to the normal line thereof). The light absorbing stripes 11 are formed by printing with a black ink. For example, if the light absorbing stripes 11 are located at the positions corresponding to the concave portions 9a of the emboss 9 comprised of the semitubular lenticular lens group, they may absorb unnecessary stray lights (light from electric lamp, outside sunlight, etc.) incident from the emboss 9 side. That is, a general projection light is incident into the screen in a direction substantially normal to the screen, and converges at the positions corresponding to the concave portions 9b of the emboss 9 on the base material sheet 3. A stray light incident at an angle greatly inclined to the screen converges at a concave portion 9a of the emboss 9 and is absorbed by a light absorbing stripe 11. The light absorbing stripes are not absolutely necessary.

If the pattern of the convexo-concave emboss 9 is a fly eye lens group instead of the lenticular lens group, the light absorbing stripes 11 cannot always be striped but may be of a network pattern for example in the case of the fly eye lens group, in which the light absorbing portion is defined only in regions other than those immediately below convex portions of respective lenses.

Figure 31:
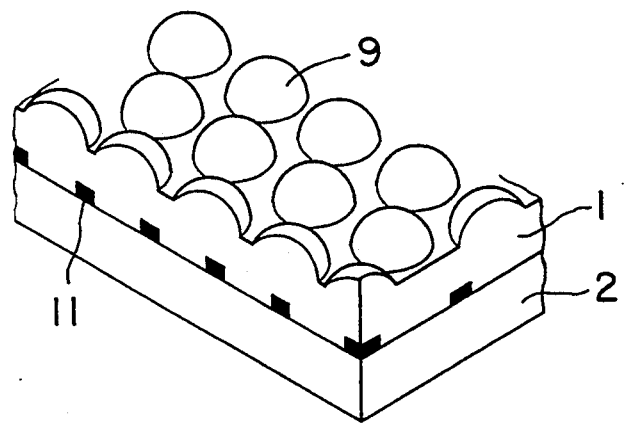
FIGS. 31, 32, and 33 are a perspective view and plan views showing a first embodiment of the reflection type projection screen according to the present invention, in which an emboss pattern of fly eye lens group and a light absorbing portion are shown.
Figure 32:
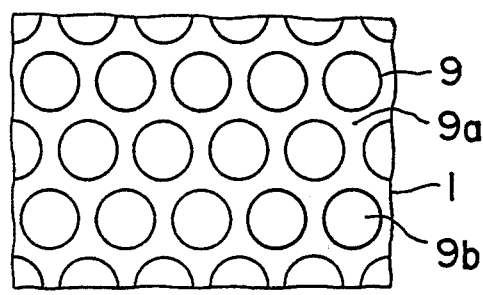
Figure 33:
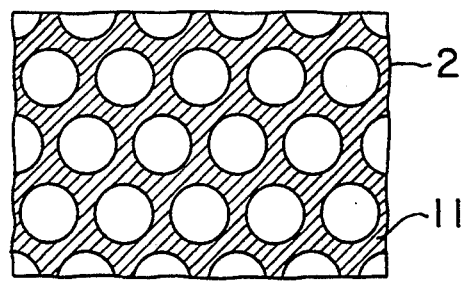

With reference to FIGS. 31-33, the light absorbing portion in the case where the pattern of the convexo-concave emboss is of the fly-eye lens group will now be described. FIG. 31 is a perspective view of the reflection type projection screen, FIG. 32 is a plan view showing the light diffusing layer, and FIG. 3 a plan view showing the reflection layer portion.

In FIGS. 31-33, the pattern is of the convexo-concave emboss 9. FIG. 32 shows the fly-eye lens group pattern. As shown in FIG. 32, the convexo-concave emboss 9 has concave portions 9a and convex portions 9b. The convex portions 9b are convex parts of the fly-eye lens group. The light absorbing portion 11 of network pattern is provided at portions other than those immediately below the convex portions 9b (or at portions corresponding to the concave portions 9a) on the reflection layer 2 (see FIG. 33). A projection light incident in the direction substantially normal to the reflection type projection screen converges at portions corresponding to convex portions 9b on the reflection layer 2, and other stray lights converge at portions corresponding to the concave portions 9a on the reflection layer 2 to be absorbed by the light absorbing portion 11.

Also, as shown in FIG. 2, the light absorbing stripes 11 are provided at positions corresponding to the concave portions 9a of the emboss 9 on the surface of the reflection layer 2 on the light diffusing layer 1 side.

Figure 3:
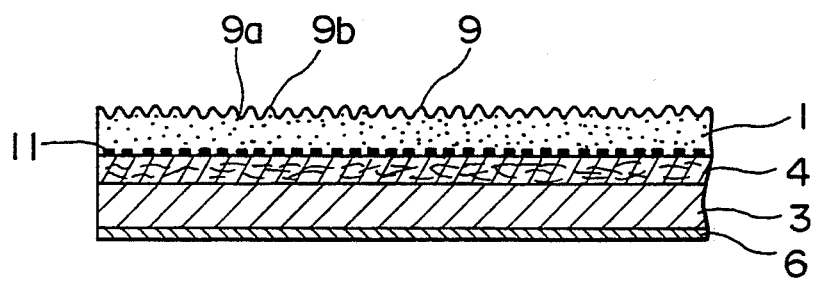
FIG. 3 is a sectional side view showing another modification of the reflection type projection screen as shown in FIG. 1.

FIG. 3 shows a second modification embodiment of the reflection type projection screen according to the present invention. As shown in FIG. 3, the reflection type projection screen is provided in order, on a non-printed surface of a base material sheet 3 of a white, opaque, flexible plastic having a solid print layer or light absorbing layer 6 of a dark ink, with a fibrous sheet 4 of glass fibers and a light diffusing layer 1 of a translucent, flexible plastic into which a lustrous pigment or calcite powder is incorporated, in which an emboss 9 is provided on the outer surface of the light diffusing layer 1. Further, as shown in FIG. 3, light absorbing stripes 11 are provided at positions corresponding to concave portions 9a of the emboss 9 on the surface of the fibrous sheet 4 adjoining the light diffusing layer 1.

Figure 4:
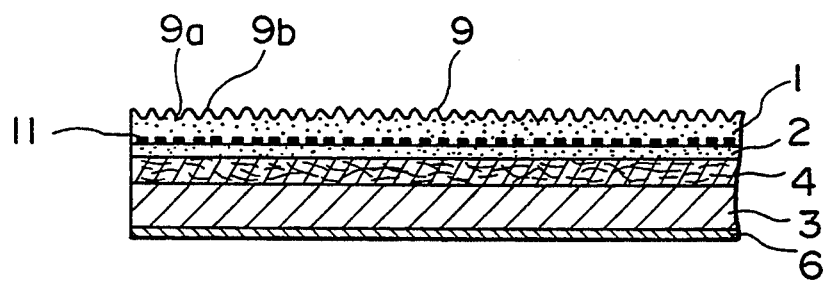
FIG. 4 is a sectional side view showing a still another modification of the reflection type projection screen as shown in FIG. 1.

The reflection type projection screen as shown in FIG. 3 may also be modified as shown in FIG. 4 as a modification embodiment similarly as described above. In detail, the modified screen is provided in order, on a non-printed surface of a base material sheet 3 of a white, opaque, flexible plastic having a solid print layer or light absorbing layer 6 of a dark ink, with a fibrous sheet 4 of glass fibers, a reflection layer 2 printed with an ink containing a lustrous pigment or calcite powder, and a light diffusing layer 1 of a translucent, flexible plastic into which a lustrous pigment or calcite powder is incorporated, in which an emboss 9 is provided on the outer surface of the light diffusing layer 1. Also, light absorbing stripes 11 are provided at positions corresponding to concave portions 9a of the emboss 9 on the surface of the reflection layer 2 adjoining the light diffusing layer 1.

The same materials as described above may be used for the base material sheet 3, for the fibrous sheet 4, for the light diffusing layer 1 of the translucent plastic sheet, and for the pigments. The light absorbing layer 6 may be formed using a normal printing in a known technique such as the gravure process and the screen process. The production of the reflection type projection screen may be conducted similarly as above by laminating and bonding with heat and pressure the base material sheet 3, the light diffusing layer 1 of the translucent plastic sheet, and the fibrous sheet 4 sandwiched between the foregoing elements, and by simultaneously imparting the emboss 9 thereon.

Figure 5:
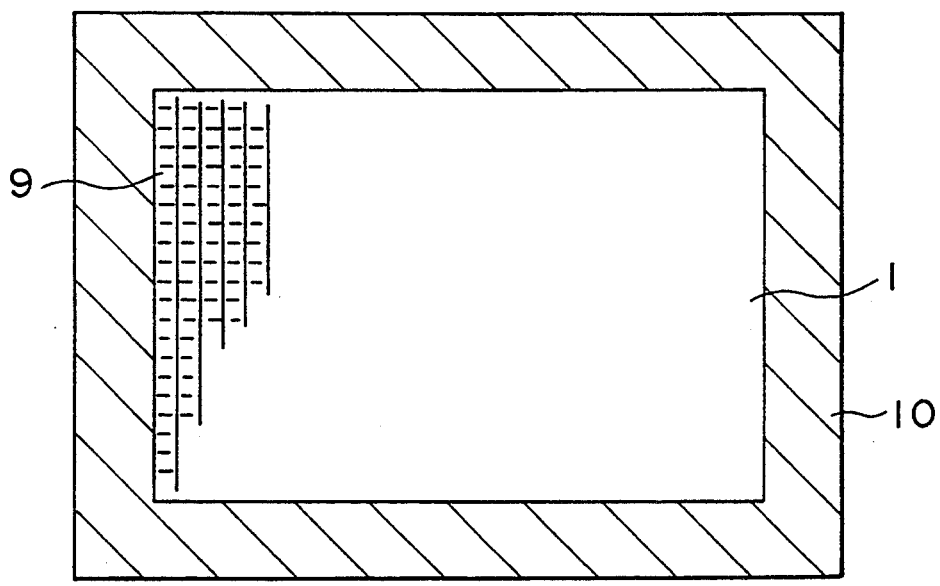
FIG. 5 is a plan view of the reflection type projection screen as shown in FIG. 1.

An outer frame 10 is printed with a dark ink as shown in FIG. 5 on the surface of the reflection type projection screen as shown in either of FIGS. 1-4 by an appropriate method such as the silk screen printing. The outer frame 10 is effective for trimming of the image at the edge, making a picture plane clearer. Therefore, the outer frame 10 is a recommended feature.

A further feature to improve capabilities to diffuse and reflect light to increase the half-value angle is such that formation of fibers and unevenness of weave pattern constituting the fibrous sheet 4 are raised on a surface of the base material sheet. The fine unevenness on the base material sheet surface contributes to enhancing the properties of diffusion and reflection of light.

1.2 Operation

According to the projection screen of the present invention, the light diffusing layer 1 of the translucent plastic containing the lustrous pigment or the like is superimposed on the white, opaque base material sheet, whereby a suitable diffusing power and a high reflectivity can be attained for the reflection type screen.

A part of light projected from a projector to the reflection type screen is reflected by the light diffusing layer 1. Another part thereof advances into the light diffusing layer, is slightly diffused therein, is reflected at the surface of the base material sheet 3, again advances into the light diffusing layer 1, and then goes out of the reflection type screen. The emboss 9 on the reflection type screen surface refracts the light entering and leaving the surface therethrough. As described, the reflection light spreads in a broad range of angle without limitation to a specific direction, whereby the reflection is accomplished with a suitable diffusion. In the arrangement with provision of the reflection layer 2, a high rate of reflection can be accomplished to obtain a high luminance on the screen surface.

1.3 Specific Examples

Example 1

A black PVC sheet (DOP: 60 phr) of a thickness of 0.2 mm was employed as a light absorbing layer 5. Superimposed in order on the PVC sheet were a fibrous sheet 4 of glass woven fabric, a white PVC calender sheet (base material sheet 3) (DOP: 60 phr) of thickness of 0.13 mm, a translucent PVC sheet (light diffusing layer 1) (DOP: 60 phr) of thickness of 0.12 mm formed by kneading about 2% by weight of pearl pigment (titanium coated mica) and extruding it, and an emboss plate of graining look. These materials were integrally bonded and embossed by heat press doubling. The half-value angle was measured for the resultant reflection type projection screen of the present invention. The measured value of the half-value angle was 45 degrees. The half-value angle is an inclination in a horizontal direction at which brightness becomes half of that in front of the screen, with respect to the normal line. This specific Example 1 corresponds to the reflection type projection screen shown in FIG. 1.

Example 2

The base material sheet 3 was a white PVC calender sheet (DOP: 60 phr) of thickness of 0.13 mm. A sheen ink with a composition as described below was printed on the base material sheet to a dry thickness of 3 μm by the gravure process, obtaining a reflection sheet composed of the base material sheet 3 and the reflection layer 2.

| | |
|---|---|
| Vehicle (PVC) | 100 parts by weight; |
| Pigment (titanium coating mica) | 20 parts by weight. |

A black PVC sheet (DOP: 60 phr) of a thickness of 0.28 mm was used for the light absorbing layer 5. Superimposed in order on the PVC sheet were a fibrous sheet 4 of glass fiber woven fabric, the above reflection sheet 3 and 2, a translucent PVC sheet (light diffusing layer 1) (DOP: 60 phr) of a thickness of 0.15 mm formed by kneading about 2% by weight of pearl pigment (titanium coating mica) and extruding it, and an emboss plate of graining look. These materials were integrally bonded and embossed by heat press doubling. The half-value angle of the resultant reflection type projection screen of the present invention was measured. The measured value of the half-value angle was 45 degrees. This specific example 2 corresponds to the reflection type projection screen shown in FIG. 2.

Comparative Example

A reflection type projection screen was produced as in Example 1 except that the translucent PVC sheet (light diffusing layer 1) was omitted. The half-value angle of the resultant screen was 25 degrees.

Example 3

A white PVC calender sheet of a thickness of 0.20 mm as the base material sheet 3, a fibrous sheet 4 of glass fiber woven fabric, and a translucent PVC sheet (light diffusing layer 1) of a thickness of 0.20 mm similar to that in Example 1 were prepared. The light absorbing layer 6 was formed by solid printing with a black ink with a pigment of carbon black on the base material sheet 3. Superimposed on a non-printed surface of the base material sheet 3 were the fibrous sheet 4 and the translucent sheet (light diffusing layer 1) provided with a print layer 2 of a thickness of 5 μm with a sheen ink of Example 2 in such a state that the printed surface was down. These materials were integrally bonded and embossed in the same manner as in Example 1.

An outer frame 10 of a black line of a width of 3 cm was printed by the silk screen printing with a black ink on the screen surface thus obtained, producing a reflection type projection screen of the present invention squared with a diagonal line of 100 inches in length. This specific Example 3 corresponds to the reflection type projection screen shown in FIG. 4.

1.4 Effect

The projection screen of the present invention makes possible the projection of a high quality image with a high luminance on a large picture plane without a difference in brightness at any view angle to the screen, and therefore can be used in combination with various projecting means such as a liquid crystal projector.

§2 Second Embodiment of Reflection Type Projection Screen

2.1 Fundamental Constitution

A second embodiment of the reflection type projection screen according to the present invention will be described in the following with reference to FIGS. 6–8.

Figure 6:
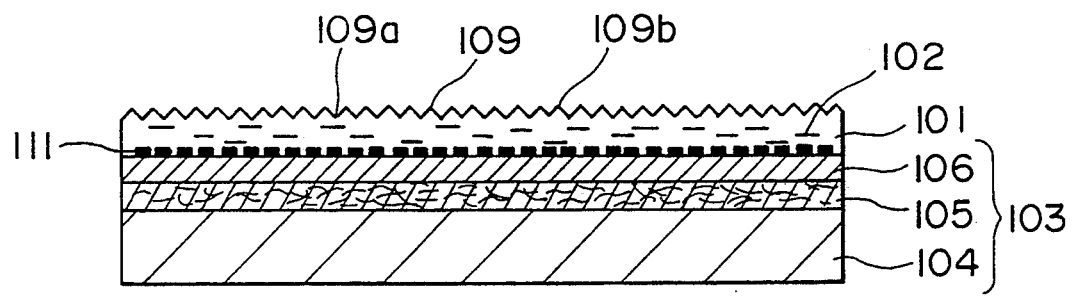
FIG. 6 is a sectional side view showing a second embodiment of the reflection type projection screen according to the present invention.

The reflection type projection screen in this second embodiment of the present invention has a constitution as shown in FIG. 6 wherein a light diffusing layer 101 of a translucent plastic sheet in which a platelet-shaped lustrous pigment 102 is incorporated is provided on a base material 103, the two faces of which are dark, for example, black, dark brown, or dark blue.

If the reflection type projection screen is used as a fixed type screen, the base material used should be a material with stiffness, for example, a metal plate such as a steel sheet or an aluminum plate, a wood plate, or a plastic plate.

On the other hand, if the screen used as a wind-up type screen, the base material 103 should be a flexible sheet in which a fibrous sheet 105 of glass fibers and a middle sheet 106 of a dark plastic sheet are laminated on a backing sheet 104 of a dark plastic sheet as well, as shown in FIG. 6.

The backing sheet 104 of the dark plastic sheet may be a plastic sheet into which a dark pigment, for example, an aniline black, a carbon black, or a red oxide, is incorporated, or a sheet on which a solid printing has been conducted with a dark ink. The plastics used for the backing sheet 104 and for the middle sheet 106 may be any of flexible plastics, for example, a polyvinyl chloride as a representative material, in addition, a polyolefin such as a polypropylene or a polyethylene, a polyester such as a polyethylene terephthalate, a polystyrene, a polycarbonate, and an acrylic resin. Particularly preferable is a soft or semirigid material in which a plasticizer is mixed in a quantity of 10–70 parts by weight, preferably 50–60 parts by weight to 100 parts by weight of polyvinyl chloride. Both thicknesses of the backing sheet 104 and of the middle sheet 106 are preferably within a range of 50–1000 $\mu$m.

The fibrous sheet 105 is for increasing the dimensional stability of the screen. Especially, when the screen is used as a wind-up screen, the fibrous sheet 105 is required to prevent the screen pulled down from sagging. When the screen is unwound in use for projection after storage in a wound condition, a remaining curling would cause an image projected to be warped. Therefore, the fibrous sheet 105 is required to have a sufficient elastic recovery and a sufficient stiffness. A material to satisfy these requirements is a woven fabric or an unwoven fabric of glass fibers.

The plastic used for the light diffusing layer 101 is the same as that used for the backing sheet 104 and the middle sheet 106 as described above.

Examples of the lustrous pigment 102 are: (a) materials called pearl pigments, specifically, ground inside portion of seashells, ground pearl, mica, finely divided particles of mica with $TiO_2$ or ion oxide baked thereon; (b) metal powders, specifically, copper, aluminum, brass, bronze, gold, silver, preferably, as finely divided particles of 1–120 $\mu$m; (c) splinters of deposited plastic film, for example a material obtained by depositing a metal as listed above, ordinarily aluminum, onto a polyethylene terephthalate film and grinding it. The lustrous pigment 102 chosen from the above should have a scaly shape. The amount of addition of the scaly lustrous pigment into the plastic is preferably 0.5–10% by weight, particularly 2% by weight.

The thickness of the light diffusing layer 101 is preferably between 40 and 800 $\mu$m, taking into consideration that an image projected should be kept bright while reducing an attenuation amount of reflected light.

A convexo-concave emboss 109 may be formed on a surface of the light diffusing layer 101. A pattern of the emboss 109 may be one with waves intersecting at 90 degrees, which is often used in conventional reflection type screens. If a light is expected to be diffused at a large half-value angle in a horizontal direction, a preferable emboss 109 is one to give a semitubular lenticular lens group with axes that are vertical. From the view point that moire fringes should be prevented from appearing on the screen, a convexo-concave pattern without a periodicity is preferable, such as a satin, a graining, or a hairline. Such a pattern is preferable especially for an image of a liquid crystal display device having rectangular pixels. In the case where a convexo-concave pattern with a periodicity, such as a pattern with waves intersecting at 90 degrees, which is often used in conventional reflection type projection screens, or a pattern with lattice, rectangular, or hexagonal cell recesses continuing, is employed, the direction of period of the convexo-concave pattern should be set at an inclination of 15–75 degrees to the periodic direction of the projection pixels. Light absorbing stripes 111 are provided at positions corresponding to concave portions 109a of the emboss 109 on the surface of the base material 103 adjoining the light diffusing layer 1. That is, the concave portions 109a are located at regions other than those on which the projection light is converged, because the projection light enters the projection screen in a direction close to the normal line thereto.

The above screen can be produced by superimposing the plastic sheets for the base material 103 and for the light diffusing layer 101, and integrally bonding them together with heat and pressure. If a lamination as above described is used as the base material 103, the screen may be made by first making the base material 103 and then laminating the light diffusing layer 101 on the base material as described above, or, by sandwiching the fibrous sheet of glass fibers between the backing sheet 104 and the lamination of the middle sheet 106 and the light diffusing layer 101, and bonding them together with heat and pressure. The lamination can be carried out by the fusion bonding process or by the dry laminating process. The lamination of the light diffusing layer 101 on the base material 101 or on the middle sheet 106 is also possible by coating an ink, a coat, or a sol of the plastic for the light diffusing layer 101, on the base material 103 or on the middle sheet 106.

If the emboss 109 is to be provided on the surface of the light diffusing layer 101, the emboss may be made simultaneously with the lamination, or, the emboss 109 may be made on the plastic sheet for the light diffusing layer 101 to be unified with the base material. In the latter, the concave and convex pattern should be formed of a cured resin in order to prevent the concave and convex pattern on the surface of the light diffusing layer 101 from being crushed by heat and pressure upon lamination. A preferable method for forming the concave and convex pattern on the sheet surface with the cured resin is the drum printing method using an ionizing radiation curing resin (Japanese Laid-open Patent Publication No. Hei 2-131175).

An outer frame 10 (see FIG. 5) using a dark ink may be printed by a suitable method such as the silk screen printing on a surface of the reflection type projection screen of the present invention. The outer frame 10 makes a picture plane clearer with proper trimming at the edges of the image. Therefore, the outer frame is a recommended feature.

For imparting a feeling of reality at the time of use of the projection screen, speakers may be positioned behind the screen and a number of small openings may be made through the screen at the positions of the speakers. A suitable size of the small openings in the screen is 0.5–2.0 mm in diameter. If opening proportion of the small openings is too high, the openings could be disturbing for the audience, who could see through the screen. If the opening proportion is too low, sounds will not pass easily through the openings. Therefore, the opening proportion of the small openings is preferably between 15 and 65%, specifically between 30 and 50%.

The "opening proportion" is the proportion of the total area of the small openings to the portion of the screen through which sounds pass. The shape of the small openings is preferably a circle or an ellipse without a sharp angle, which is resistant to tearing when the screen is pulled. The small openings may be provided over the entire surface of the screen if desired. If the positions of the speakers located behind the screen are fixed as in a fixed screen, the small openings may be provided only at portions facing the speakers. Perforation of the screen can be carried out by punching with cutting die, drilling, or melting with $CO_2$ laser.

2.2 Operation

A projection light enters the projection screen in a direction close to the normal direction thereto, while a stray light from the outside of window or from an electric lamp inside a room enters the projection screen in a direction inclined with respect to the normal line. In the production of the light diffusing layer 101, the scaly lustrous pigment 102 exists therein in such a state that layer planes thereof are substantially in parallel with the surface of the projection screen.

Let the quantity of a projection light incident into the projection screen be $L_p$, the quantity of stray light be $L_s$, the quantity of the projection light reflected and leaving be $R_p$, and the quantity of the stray light reflected and leaving be $R_s$.

Figure 7:
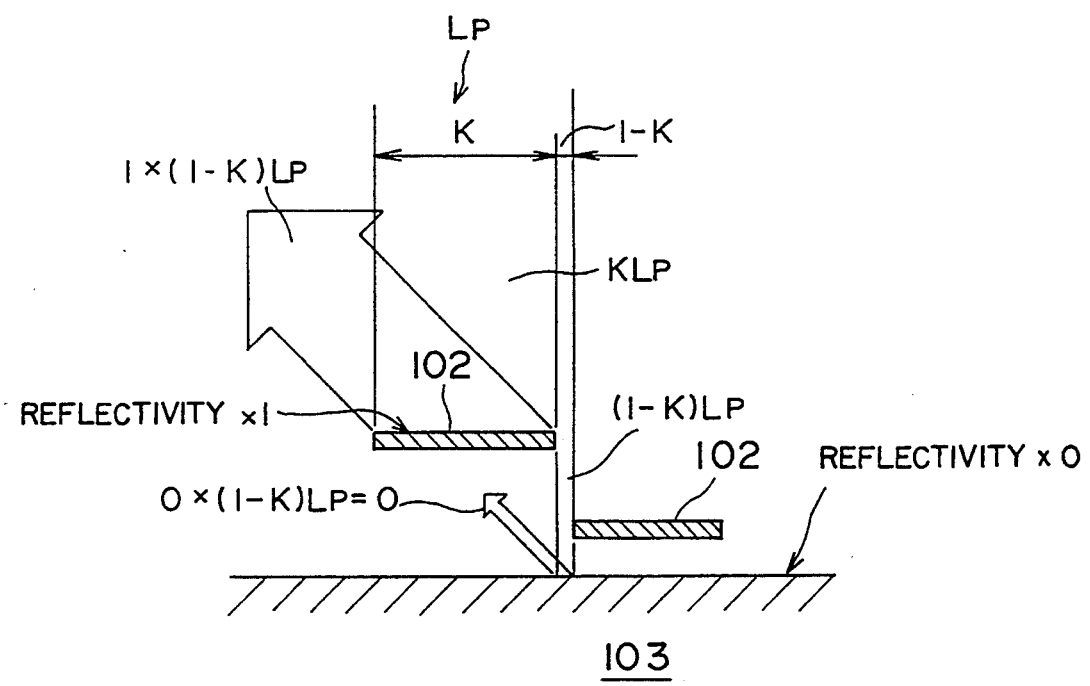
FIG. 7 is a diagram to illustrate a locus of projection light in the reflection type projection screen as shown in FIG. 6.

Letting the rate of area occupied by the lustrous pigment 102 in the overall area when seen in a direction of the projection light on the projection screen (represented by the normal line) be K, the light amount $L_p$ of the incident projection light may be separated into a portion $K \times L_p$ where the projection light is incident onto the surface of pigment and the other portion $(1-K) \times L_p$ where the projection light reaches the surface of the base material through spaces between pigment particles, as shown in FIG. 7.

Similarly, letting the rate of area occupied by the lustrous pigment in the overall area of the projection screen when seen in a direction of the stray light (represented by an inclination $\theta$, though there are many stray lights incident in various directions inclined to the normal line) be K', the light amount $L_s$ of the incident stray light may be separated into a portion $K' \times L_s$ where the stray light is incident onto the surface of pigment and the other portion $(1-K') \times L_x$ where the stray light reaches the surface of the base material, as shown in FIG. 3.

In a conventional projection screen using a white base material, assuming that the reflectivity of the surfaces of the lustrous pigment and of the white base material is 100%, the light amount $R_p$ of the reflected projection light and the light amount $R_s$ of the reflected stray light may be respectively calculated as follows:

$$R_p = 1 \times K \times L_p + 1 \times (1-K) \times L_p = L_p \qquad (1);$$

$$R_s = 1 \times K' \times L_s + 1 \times (1-K') \times L_s = L_s \qquad (2).$$

The SN ratio, i.e., a ratio of the light amount of the projection light to the light amount of the stray light, is as follows:

$$R_p/R_s = L_p/L_s \qquad (3).$$

There is no difference in the SN ratio between the reflection light and the incident light, and therefore no improvement is achieved.

Since the projection screen of the present invention uses the black base material 103, the reflectivity of the surface thereof is approximately equal to 0%. Thus, $$R_p = 1 \times K \times L_p + 0 \times (1-K) \times L_p = K \times L_p \qquad (4);$$

$$R_s = 1 \times K' \times L_s + 0 \times (1-K') \times L_s = K' \times L_s \qquad (5).$$

The SN ratio may be expressed as follows:

$$R_p/R_s = K \times L_p / K' \times L_s \qquad (6).$$

Figure 8:
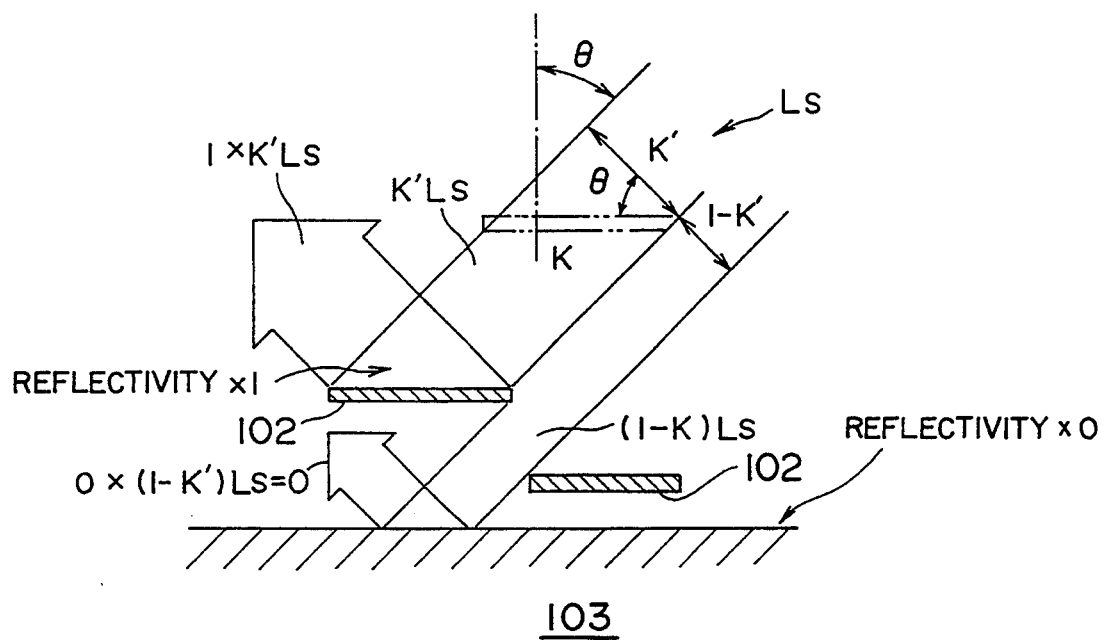
FIG. 8 is a diagram to illustrate a locus of stray light in the reflection type projection screen as shown in FIG. 6.

As seen from comparison between FIGS. 7 and 8, $$K' = K \times \cos \theta \qquad (7).$$

Since $\cos \theta < 1$ under a condition of $\theta > 0$, $$K' < K, \text{ that is, } K/K' > 1 \qquad (8).$$

Arranging the equation (6), $$(R_p/R_s)/(L_p/L_s) = K/K'.$$

Then, $$R_p/R_s > L_p/L_s.$$

Thus, the SN ratio of the reflection light is improved as compared to that of the incident light. Therefore, a projection image can be projected with a high contrast.

As explained, the projection screen of the present invention is not readily affected by stray lights as compared to the conventional projection screens and therefore can provide a clear image even when used in a bright place.

2.3 Specific Example

A black polyvinyl chloride sheet (DOP: 60 phr) of a thickness of 200 μm in which a carbon black pigment was incorporated was prepared as a backing sheet 104 to be used as a base material 103 after lamination. Further, a fibrous sheet 105 of a glass fiber woven fabric and a black PVC calender sheet (DOP: 60 phr) of a thickness of 130 μm in which a carbon black pigment was incorporated to be used as a middle sheet 106 were prepared.

The fibrous sheet 105 and the middle sheet 106 were superimposed in order on the above backing sheet 104. Further superimposed thereon in order were a translucent polyvinyl chloride sheet (DOP: 60 phr) of a thickness of 120 μm as a light diffusing layer 101, which was formed by kneading about 2 % by weight of a pearl pigment (scaly titanium coated mica with an average grain size of 17 μm) in PVC and extruding it, and a matte emboss plate of graining look. These materials were bonded integrally in lamination and embossed by heat pressing. Separated from the embossing plate after cooling, a reflection type projection screen of the present invention was obtained.

2.4 Effect

The projection screen of the present invention can provide a high contrast of image, and therefore can present a clear image even in a bright place. The production of the projection screen is easier than that in the case where black stripes are used, and results in a higher yield percentage of quality products.

§3 Third Embodiment of Reflection Type Projection Screen

3.1 Fundamental Constitution

A third embodiment of the reflection type projection screen according to the present invention will be described with reference to FIGS. 9-11.

Figure 9:
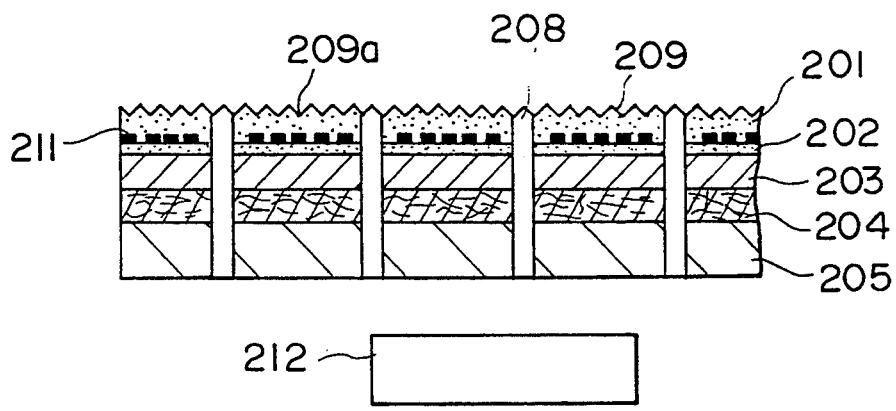
FIG. 9 is a sectional side view showing a third embodiment of the reflection type projection screen according to the present invention.

As shown in FIG. 9, the fundamental constitution of this reflection type projection screen of the present invention includes a number of small openings provided at least at a position of a speaker in a flexible sheet.

Figure 11:
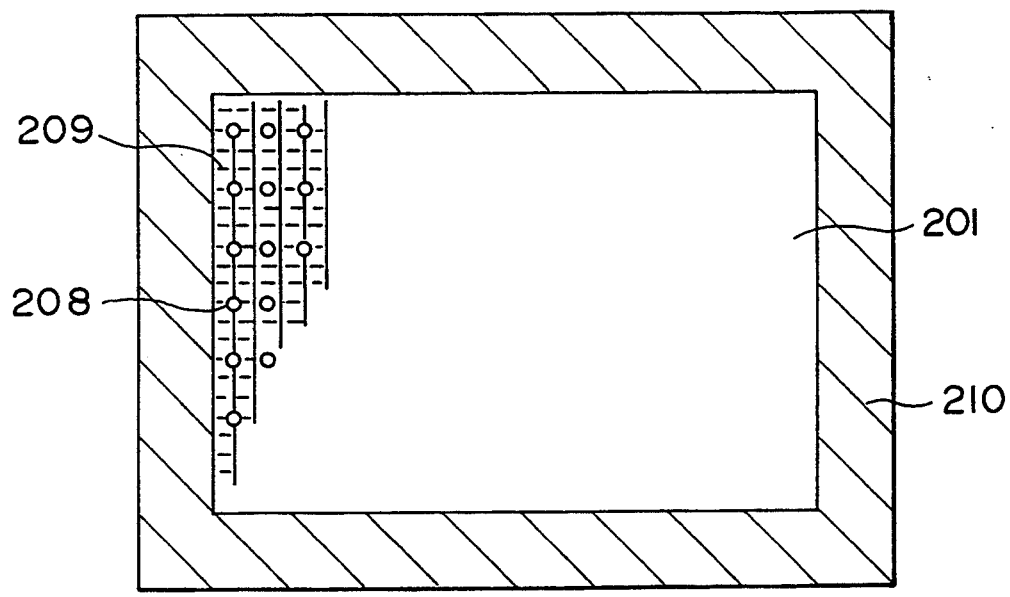
FIG. 11 is a plan view of the reflection type projection screen as shown in FIG. 9.

In detail, a specific embodiment of the reflection type projection screen of the present invention is provided in order, as seen in FIG. 9, showing a cross section, on a light absorbing layer 205 of a dark plastic sheet, with a fibrous sheet 204 having a flexibility, a reflection sheet 202, 203 having a base material sheet 203 of a white, opaque, flexible plastic and a reflection layer 202 printed with an ink containing a lustrous pigment or calcite powder, and a light diffusing layer 201 of a translucent, flexible plastic containing a lustrous pigment or calcite powder, in which a convexo-concave emboss 209 is provided on the outer surface of the light diffusing layer 201, as seen in FIG. 11 showing the entire screen. Numerous small openings 208 are provided at least at a position of a speaker 212 located behind the screen to allow sounds from the speaker 212 to pass therethrough. A stiff base plate may replace the flexible fibrous sheet 204. Also, light absorbing stripes 211 may be provided at positions corresponding to concave portions 209a of the emboss 209 on the surface of the reflection layer 202 adjoining the light diffusing layer 201.

The plastics used for the base material sheet 203 and for the light diffusing layer 201 may be any of flexible plastics, for example, specifically a polyvinyl chloride, in addition, a polyolefin such as a polypropylene and a polyethylene, a polyester such as polyethylene terephthalate, a polycarbonate, or an acrylic resin. Specifically, a soft material in which a plasticizer is added by 50-60 parts by weight to 100 parts by weight of polyvinyl chloride is preferable. Both thicknesses of the base material sheet 203 and of the light diffusing layer 201 are between 0.05 and 1 mm.

A sheet formed by kneading a white pigment and a lustrous pigment in a plastic may be used as the base material sheet 203. It is, however, difficult to obtain a plastic in which a large amount of coarse grains of lustrous pigment are uniformly dispersed. Further, it is not advantageous to use a large amount of expensive lustrous pigment. In addition, such a sheet has a low flexibility. Thus, printing with an ink containing the lustrous pigment on a sheet formed by kneading only the white pigment therein is advantageous. Titanium dioxide (titanium white) is most preferable as the white pigment with respect to whiteness degree and to degree of opacity power, but antimony trioxide and zinc white may also be employed.

The ink used to form the reflection layer 202 printed on the base material sheet 203 is an ink in which a lustrous pigment or calcite powder is dispersed in a normal ink vehicle (as will be referred to as "sheen ink"). Examples of the lustrous pigment are as follows: (a) materials called pearl pigments, specifically, ground inside portion of seashells, ground pearl, mica, finely divided particles of mica with $TiO_2$ or ion oxide baked thereon; (b) metal powders, specifically, copper, aluminum, brass, bronze, gold, silver, preferably in the form of finely divided particles of 1-120 $\mu$m; (c) splinters of a deposited plastic film, for example a material obtained by depositing a metal as listed above, normally aluminum, onto a polyethylene terephthalate film and grinding it.

Although the proportion of the lustrous pigment is preferably as high in the ink as possible, a too low proportion of the vehicle makes the formation of the print layer difficult on the base material sheet 203. Then, a preferable composition of the ink is 5-50 parts by weight of vehicle to 100 parts by weight of pigment.

The calcite powder contained in the ink preferably has an average grain size of 2-20 $\mu$m and a size distribution as narrow as possible. For example in case of an average grain size of 5 $\mu$m, a size distribution is such that more than 80% by weight is within a range of 3-7 $\mu$m. For the same reason with regard to the lustrous pigment, a preferable composition of the ink is 10-100 parts by weight, specifically 10-50 parts by weight, of the vehicle to 100 parts by weight of the calcite powder.

The printing to form the reflection layer 202 may be any one of known techniques such as printing methods of the gravure process, the silk screen process, or the like, and coating methods of the spray coat, roll coat, or the like. A sufficient thickness of the reflection layer 202 is 1 $\mu$m or more in a dry state.

The lustrous pigment or the calcite powder added into the plastic for the light diffusing layer 201 may be those as described above. The amount thereof is preferably 0.5-10% by weight, specifically about 2% by weight. The light reflection layer 201 is preferably formed by printing with a coat containing the abovementioned lustrous pigment for uniform and isotropic reflection of light, but may also be formed by depositing a metal thin layer of aluminum, chromium, or the like on the base material sheet 203.

The flexible fibrous sheet 204 is for enhancing the dimensional stability of the screen. Particularly, when the screen is used as a wind-up screen, the fibrous sheet is required to prevent the screen pulled down from sagging. Further, when the screen is unwound for projection after storage in a wound condition, a remaining curling may cause a projected image to be warped. Thus, the fibrous sheet is required to have an ample elastic recovery. A material to satisfy these requirements is a woven fabric or an unwoven fabric of glass fibers.

Various methods may be considered to make the small openings 208 in the projection screen of flexible sheet which can be wound up. For example, on a surface of the light diffusing layer 201 of sheet with the aforementioned lustrous pigment incorporated into or coated on a single member or a lamination of the abovementioned plastic base material sheet 203 and the fibrous sheet 204, a fine convexo-concave emboss 209 of graining, lattice, rectangular, or hexagonal cell recesses is processed according to necessity by an embossing process over the entire surface thereof, and the small openings 208 are perforated therethrough.

For a screen of fixed type, a base plate 204 with stiffness, for example a metal plate, a wood plate, or a plastic plate, is used.

The plastic sheet for the light absorbing layer 205 is one obtained by kneading a dark, for example, black, dark brown, or dark blue, pigment such as an aniline black, a carbon black, and a red oxide in a plastic material, and by forming it. The thickness of the light absorbing layer 205 is preferably equal to the total thickness of the reflection sheet 202, 203 and the light diffusing layer 201, balancing the screen in the direction of thickness.

The above screen can be produced by sandwiching the fibrous sheet 204 or the base plate between the plastic sheet for the light absorbing layer 205 and the lamination of the reflection layer 202 and the light diffusing layer 201, consolidating these materials with heat and pressure, and simultaneously making the emboss on the surface of the light diffusing layer 201. The integrally consolidating may be carried out by the fusion bonding process or by the dry laminate process.

The lamination of the reflection sheet 202, 203 and the light diffusing layer 201 can be carried out by laminating the plastic sheet for the light diffusing layer 201 on the reflection sheet 202, 203, or, by coating a sol of the plastic for the light diffusing layer 201 on the reflection sheet 202, 203.

The size of the small openings 208 provided in the screen is preferably between 0.5 and 2.0 mm in diameter. A too high opening proportion will make the openings conspicuous for audience and expose the rear side while a too low opening proportion will make the sounds difficult to pass therethrough. Thus, a preferable opening proportion is between 15 and 65%, specifically between 30 and 50%. The "opening proportion" is the proportion of total area of the small openings to the area of the portion of the screen through which the sounds pass. The shape of the small openings is preferably a circle or an ellipse, which is resistant to tearing when the screen is pulled.

The small openings 208 could be provided over the entire surface of the screen. If the position of the speaker 212 located behind the screen is fixed as in a fixed screen, the small openings may be made only in a portion facing the speaker 212.

The perforation of the screen is carried out by punching with a cutting die, drilling, or melting with $CO_2$ laser.

The pattern of the emboss 209 may be a pattern with waves intersecting at 90 degrees, which is often used in conventional reflection type projection screens. Also, the pattern of the emboss may be arbitrarily chosen from a graining look, a hairline look, or the like.

Figure 10:
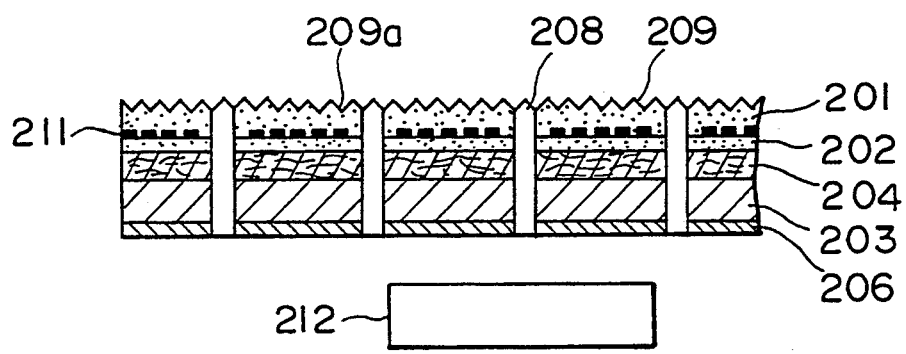
FIG. 10 is a sectional side view showing a modification of the reflection type projection screen as shown in FIG. 9.

A modification embodiment of the reflection type projection screen of the present invention is provided in order on a non-printed surface of a base material sheet 203 of a white, opaque, flexible plastic having a light absorbing layer 206 which is a solid print layer of a dark ink, as shown in FIG. 10, with one 204 of a flexible fibrous sheet or a stiff base plate, and a reflection layer 202 of an ink containing a lustrous pigment or calcite powder on a lower surface of a translucent, flexible plastic sheet 201 for a light diffusing layer into which a lustrous pigment or calcite powder is incorporated, in which an emboss 209 is provided on the outer surface of the light diffusing layer 201. Further, a number of small openings like pin holes 208 are provided at least at a position of a speaker 212, through which the sounds from the speaker 212 located behind the screen may pass. Also, light absorbing stripes 211 are provided at positions corresponding to concave portions 209a of the emboss 209 on the surface of the reflection layer 202 on the side of the light diffusing layer 201. That is, since the projection light enters the projection screen near the normal line, the concave portions 209a are regions other than those on which the projection light is converged.

The same materials as described above may be used for the base material sheet 203, for the fibrous sheet or the base plate 204, for the translucent plastic sheet, and for the pigment. The small openings 208 made through the screen are also similar to those as described above. The light absorbing layer 206 may be formed using a normal printing in a known technique such as the gravure process and the screen process. The production of the screen may be carried out in the same manner as described above, i.e., by sandwiching the fibrous sheet or the base plate 204 between the base material sheet 203 and the translucent plastic sheet 201, 202, compounding them with heat and pressure, and simultaneously imparting the emboss 209.

An outer frame 210 is printed as shown in FIG. 11 by a suitable method such as silk screen printing on the surface of the reflection type projection screen of the present invention as shown in FIGS. 9 and 10. Such a procedure is effective for trimming of the image at the edge, presenting a clearer picture plane. Therefore, this is the method recommended.

3.2 Operation

The projection screen of the present invention has the numerous small openings 208, which enable sounds to easily passing therethrough. Such small openings prevent the sounds from the speaker 212 from being confined, to transmit them before the screen, increasing the power from the picture plane. Selecting the size, the shape, and the opening proportion of the small openings 208, the influence thereof on an image can be minimized.

3.3 Specific Examples

Example 1

A white PVC calender sheet (DOP: 60 phr) of a thickness of 0.13 mm was employed as a base material sheet 203. A sheen ink with a composition as described below was printed thereon by the gravure process in a dry thickness of 3 μm to obtain a reflection sheet 202, 203 having a reflection layer 202.

| Sheen Ink | |
|---|---|
| Vehicle (PVC) | 100 parts by weight; |
| Pigment (titanium coating mica) | 20 parts by weight. |

A black PVC sheet (containing 60 phr of DOP as a plasticizer) of a thickness of 0.28 mm was employed as a light absorbing layer 205. Superimposed thereon in order were a fibrous sheet 204 of glass fiber woven fabric, the above reflection sheet 202, 203, a translucent PVC sheet 201 (DOP: 60 phr) of a thickness of 0.15 mm formed by kneading about 2% by weight of pearl pigment (titanium coating mica) in PVC and extruding it, and an emboss plate of graining look. These materials were integrally bonded and embossed by heat press doubling.

The lamination was blanked by pressing to make small openings 208 of circular section in diameter of 0.5 mm at an opening proportion of 55% over the entire surface of the screen, thereby obtaining a projection screen of the present invention. This specific Example 1 corresponds to the reflection type projection screen as shown in FIG. 9.

Example 2

A white PVC calender sheet of thickness of 0.20 mm as a base material sheet 203, a base plate 204 made of an acrylic resin of thickness of 5 mm, and a translucent PVC sheet 201 of thickness of 0.20 mm as in Example 1 were prepared.

A black ink using a pigment of carbon black or the like was printed as a solid print on the base material sheet 203 to form a light absorbing layer 206. Superimposed on a non-printed surface of the base material sheet 203 were the base plate 204, and the translucent sheet 201 provided with the reflection layer of thickness of 5 μm printed with the sheen ink of Example 1 in such a state that the printed face was down. These materials were bonded integrally and embossed on the translucent sheet 201 in the same manner as in Example 1.

The lamination was blanked by pressing to make small openings 208 of circular section of a diameter of 0.8 mm at an opening proportion of 40% in portions between the right edge and 40 cm therefrom and between the left edge and 40 cm therefrom.

An outer frame 210 of black line was printed with an black ink by the silk screen process with a width of 3 cm on a surface of the screen thus obtained, producing a reflection type projection screen of the present invention squared with a length of a diagonal line of 100 inches.

3.4 Effect

The projection screen of the present invention is effective for projection of a high quality image on a large picture plane with a high luminance, and for a supply of sounds from a speaker located at a suitable position behind the screen to the audience, increasing the on-the-scene feeling. Therefore, the projection screen is suitable for use in combination of various projection means such as a liquid crystal projector with an acoustic instrument such as a stereo.

§4 Fourth Embodiment of Reflection Type Projection Screen

4.1 Fundamental Constitution

A fourth embodiment of the reflection type projection screen according to the present invention will be described with reference to FIGS. 12–19.

Figure 12:
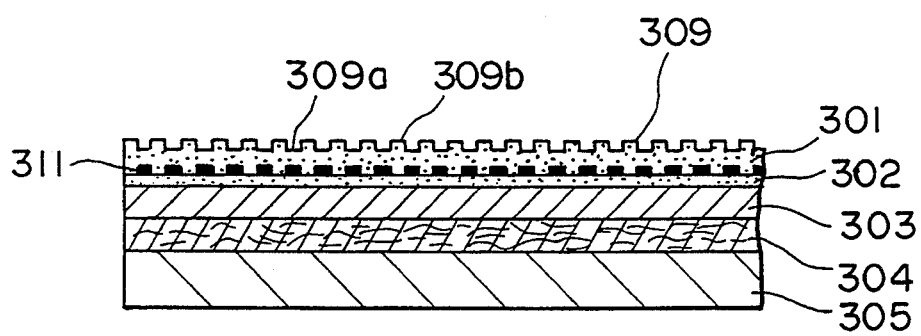
FIG. 12 is a sectional side view showing a fourth embodiment of the reflection type projection screen according to the present invention.

One embodiment of the reflection type projection screen of the present invention is provided in order on a light absorbing layer 305 of a dark plastic sheet, as shown in FIG. 12, with one 304 of a flexible fibrous sheet and a stiff base plate, a reflection sheet 302, 303 in which a reflection layer 302 is printed with an ink containing a lustrous pigment or calcite powder on an upper surface of a base material sheet 303 of a white, opaque, flexible plastic, and a light diffusing layer 301 of a translucent, flexible plastic containing a lustrous pigment or calcite powder, in which an emboss 309 is provided on the outer surface of the light diffusing layer 301. A convexo-concave pattern of the emboss 309 may have either no periodicity or such a periodicity that the periodic direction of the convexo-concave pattern is inclined at 15–75 degrees to the direction of period of projection pixels as detailed later.

Figure 13:
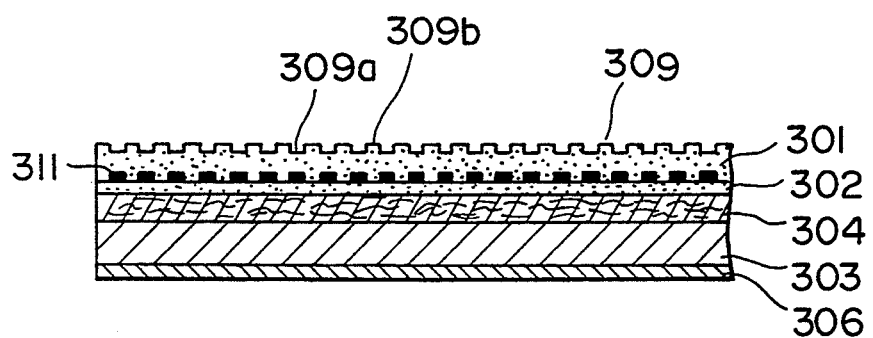
FIG. 13 is a sectional side view showing a modification of the reflection type projection screen as shown in FIG. 12.

A modification embodiment of the reflection type projection screen of the present invention is provided in order on a non-printed surface of a base material sheet 303 of a white, opaque, flexible plastic having a light absorbing layer 306 of a solid print layer of a dark ink, as shown in FIG. 13, with one 304 of a flexible fibrous sheet and a stiff base plate, and a sheet 301, 302 in which a reflection layer 302 of an ink containing a lustrous pigment or calcite powder is provided on a lower surface of a translucent, flexible plastic sheet for a light diffusing layer 301 into which a lustrous pigment or calcite powder is incorporated, in which an emboss 309 is provided on the outer surface of the light diffusing layer 301. A convexo-concave pattern of the emboss 309 may have either no periodicity or such a periodicity that a periodic direction of the convexo-concave pattern is inclined at 15–75 degrees to the direction of period of projection pixels.

The plastics used for the base material sheet 303 and for the light diffusing layer 301 may be any of flexible plastics, for example, specifically a polyvinyl chloride, in addition, a polyolefin such as a polypropylene and a polyethylene, a polyester such as a polyethylene terephthalate, a polycarbonate, an acrylic resin, etc. Specifically, a soft material is preferable in which a plasticizer is added by about 50–60 parts by weight to 100 parts by weight of polyvinyl chloride. Both thicknesses of the base material sheet and of the light diffusing layer is between 0.05 and 1 mm.

A sheet formed by kneading a white pigment and a lustrous pigment in a plastic may be used as the base material sheet 303. However, it is difficult to disperse uniformly a large amount of coarse grains of lustrous pigment in a plastic. Also, it is not advantageous to use a large amount of expensive lustrous pigment. Further, such a sheet has a low flexibility. Thus, it is advantageous that an ink containing a lustrous pigment be printed on a sheet formed by kneading only a white pigment in a plastic. One of most preferable white pigments is titanium dioxide (titanium white) in respect of whiteness degree and opacifying power, but antimony trioxide, zinc white and others may also be employed.

The ink to form the reflection layer 302 printed on the base material sheet 303 is an ink in which a lustrous pigment or calcite powder is dispersed in an ordinary ink vehicle (as will be referred to as "sheen ink"). Examples of the lustrous pigment are as follows: (a) materials called pearl pigments, specifically, ground inside portion of seashells, ground pearl, mica, finely divided particles of mica with $TiO_2$ or ion oxide baked thereon; (b) metal powders, specifically, copper, aluminum, brass, bronze, gold, silver, preferably, of finely divided particles of 1–120 μm; (c) splinters of deposited plastic film, for example a material obtained by depositing a metal as listed above, ordinarily aluminum, onto a polyethylene terephthalate film and grinding it.

Although it is preferable that the proportion of the lustrous pigment in the ink to form the reflection layer 302 is as high as possible, a too low proportion of the vehicle makes the formation of the print layer difficult on the base material sheet 303. Thus, the composition of the ink is preferably 5–50 parts by weight of the vehicle to 100 parts by weight of the pigment.

The calcite powder contained in the ink preferably has an average grain size of 2–20 μm and a size distribution as narrow as possible. For example, in case of an average grain size of 5 μm, the size distribution is such that more than 80% by weight fall within a range of 3–7 μm. For the same reason as above, the composition of the ink is preferably 10–100 parts by weight, specifically 10–50 parts by weight, of vehicle to 100 parts by weight of calcite powder.

The printing to form the reflection layer 302 may be carried out by a known technique such as a printing method of the gravure process, the silk screen process, or the like, and a coating method of the spray coat, the roll coat, or the like. A sufficient thickness of the print layer is 1 μm or more in a dry state.

The lustrous pigment or the calcite powders added into the plastic for the light diffusing layer 301 may be the same as above. A preferable dispersion amount thereof is 0.5–10% by weight, specifically about 2% by weight. The light reflection layer 301 is preferably formed by print coating with a coat containing the above-mentioned lustrous pigment in respect of uniform and isotropic reflection of light. The light reflection layer 301 may be also formed by depositing a metal thin layer of aluminum, chromium, or the like on the base material sheet.

The flexible fibrous sheet 304 is for enhancing the dimension stability of the screen. Particularly, when the screen is used as a wind-up screen, the fibrous sheet is required to prevent the screen pulled down from sagging. Also, when the screen is unwound in use for projection after storage in a wound condition, a remaining curling may cause an image projected to be warped. Therefore, the fibrous sheet is required to have a sufficient elastic recovery. A material to satisfy these requirements is a woven fabric or an unwoven fabric of glass fibers.

For a screen of fixed type, the stiff base plate 304 may be for example a metal plate, a wood plate, or a plastic plate.

The plastic sheet for the light absorbing layer 305 is obtained by incorporating a dark, for example, black, dark brown, or dark blue, pigment, for example, an aniline black, a carbon black, or a red oxide, into the plastic material as in the case of the base material sheet. The thickness of the sheet is preferably equivalent to the total thickness of the reflection sheet 302, 303 and the light diffusing layer 301, which balances the screen in the direction of thickness.

The above screen can be produced by sandwiching one 304 of the fibrous sheet and the base plate between the plastic sheet for the light absorbing layer 305 and the lamination of the reflection layer 302 and the light diffusing layer 301, consolidating them with heat and pressure, and simultaneously imparting an emboss on the surface of the light diffusing layer 301. The consolidation may be carried out by either the fusion bonding method or the dry laminate method.

The lamination of the reflection sheet 302, 303 and the light diffusing layer 301 may be conducted by laminating the plastic sheet for the light diffusing layer 301 on the reflection sheet 302, 303, or, by coating a sol of the plastic for the light diffusing layer 301 on the reflection sheet.

A preferable pattern of the emboss 309 is a satin, a graining, or a hairline, which has no periodicity in convexo-concave pattern. The pattern may be a pattern with waves intersecting at 90 degrees, which is often used in conventional reflection type projection screens, or a pattern in which lattice, rectangular, or hexagonal cell recesses continue. In the case where the convexo-concave pattern has such a periodicity, the periodic direction of the convexo-concave pattern must be inclined at 15–75 degrees to the periodic direction of projection pixels, as described above.

In another modification embodiment as shown in FIG. 13, a light absorbing layer 306 is formed using a normal printing by a known technique such as the gravure process, the screen process, and the like. The production of the screen may be conducted in the same manner as above, i.e., by sandwiching one 304 of a fibrous sheet and a base plate between a base material sheet 303 having a light absorbing layer 306 and a translucent plastic sheet 301 having a reflection Layer 302, consolidating them with heat and pressure, and simultaneously making an emboss 309 thereon.

Figure 14:
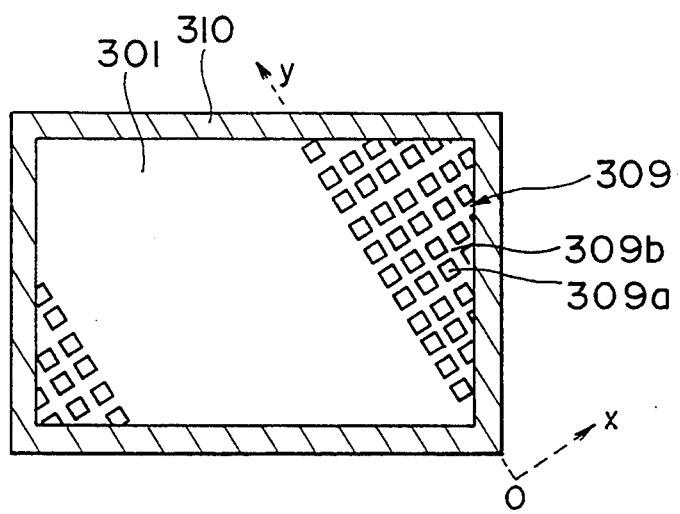
FIG. 14 is a plan view of the reflection type projection screen as shown in FIG. 12.

As shown in FIG. 14, an outer frame 310 of a dark ink is printed by a suitable method such as silk screen printing on a surface of the light diffusing layer 301 in the reflection type projection screen of the present invention. The outer frame 310 produces a proper trimming on an image at the edge, making the picture plane clearer. Thus, this is the recommended arrangement.

For a need to enhance the on-the-scene feeling in use of the projection screen, a speaker may be set behind the screen and numerous small openings may be provided at a position of the speaker in the screen. The size of the small openings made in the screen is preferably between 0.5 and 2.0 mm in diameter. A too high opening proportion makes the openings outstanding for audience as to look through the screen while a too low opening proportion makes sounds difficult to pass therethrough. Thus, a preferable opening proportion is between 15 and 65%, specifically between 30 and 50%. The "opening proportion" is a proportion of the total area of the small openings relative to the area of the portion of the screen through which sounds pass. The shape of the small openings is preferably a circle or an ellipse, which is resistant to tearing when the screen is pulled. The small openings may be provided over the entire surface of the screen if desired. Also, if the position of the speaker is fixed behind the screen as in a screen of fixed type, the small openings may be provided only at the portion facing the speaker. The perforation of the screen may be carried out by means of punching with a cutting die, drilling, or melting with $CO_2$ laser.

Also, in FIGS. 12 and 13, light absorbing stripes 311 are provided at positions corresponding to concave portions 309a of the emboss 309 on the surface of the reflection layer 302 on the side of the light diffusing layer 301. In other words, the concave portions 309a are regions other than those on which the projection light is converged, because the projection light enters the projection screen near the normal line thereof.

The pattern of the emboss 309 formed on the surface of the light diffusing layer 301 will be next described with reference to FIGS. 14–19. In detail, if the convexo-concave pattern of the emboss 309 has a periodicity, the periodic direction of the convexo-concave pattern is inclined at an angle of 15–75 degrees to the arrangement direction of projection pixels. Or, the convexo-concave pattern of the emboss 309 may not have a periodicity.

Figure 15:
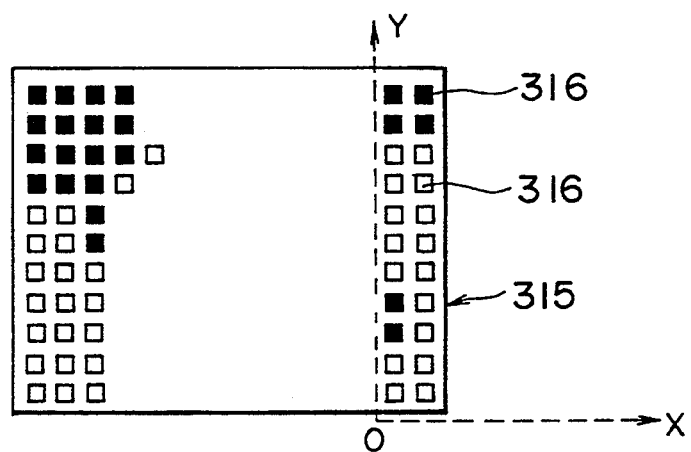
FIG. 15 is a plan view to show a picture plane to be projected onto a projection screen.
Figure 16:
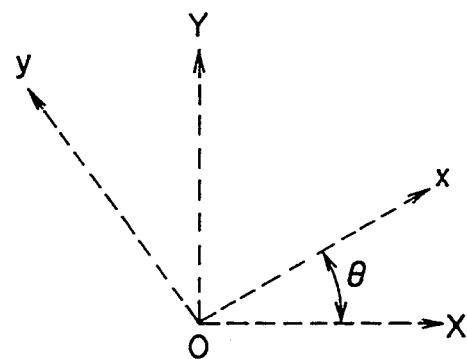
FIG. 16 is a diagram to show a direction of period of emboss on a projection screen and a direction of arrangement of projection pixels of the picture plane.

FIGS. 14–16 are drawings to show a case in which the convexo-concave pattern of the emboss 309 has a periodicity. In FIG. 14, the emboss 309 comprises concave portions 309a positioned with a periodicity and portions 309b (convex portions) excluding the concave portions 309a. On the reflection type projection screen, the concave portions 309a of the emboss 309 are arranged with a periodicity and the periodic direction is the x direction in the x-y coordinates in FIG. 14. Also, in FIG. 15, numeral 315 denotes a picture plane to be projected on the reflection type projection screen. The picture plane 315 comprises a number of projection pixels 316, and the arrangement direction of the projection pixels 316 is the X direction on the X-Y coordinates in FIG. 15.

FIG. 16 is a superposition of the x-y coordinates in FIG. 14 and the X-Y coordinates in FIG. 15. As shown in FIG. 16, the x-y coordinates and the X-Y coordinates are inclined to each other by $\theta$. The inclination angle $\theta$ is set as follows:

$$15° \leq \theta \leq 75°.$$

Figure 17:
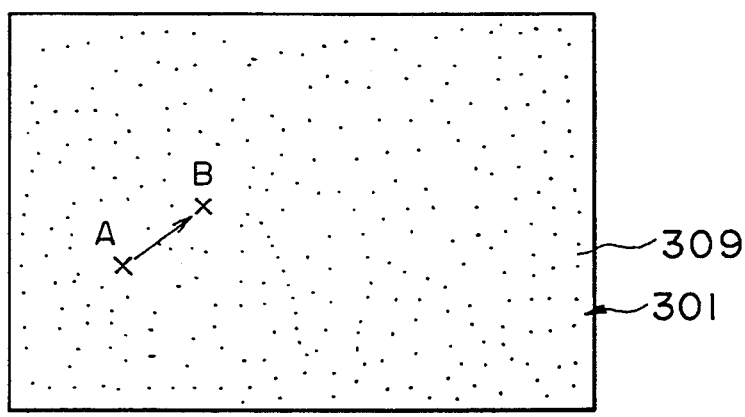
FIGS. 17, 18, and 19 are a plan view, a partial perspective view, and a surface contour reperesentation to show states of an emboss without a periodicity on a projection screen.
Figure 18:
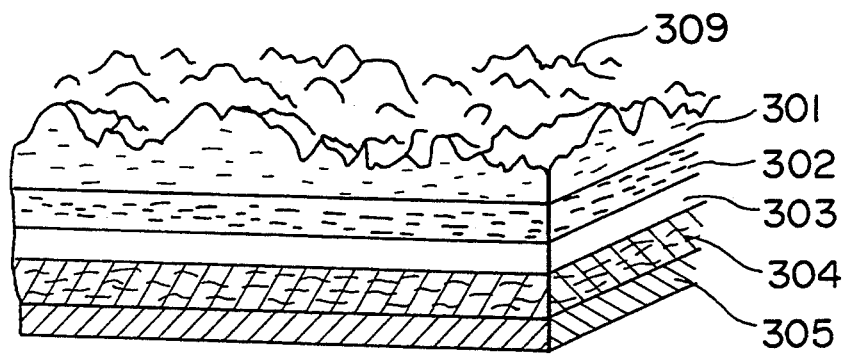

Next, a case in which the convexo-concave pattern of the emboss 309 does not have a periodicity will be described with reference to FIGS. 17–19. As shown in FIGS. 17 and 18, the emboss 309 of the convexo-concave pattern without a periodicity is formed on the outer surface of the light diffusing layer 301. Such a convexo-concave pattern is called a satin pattern, a graining pattern, or the like.

Figure 19:

FIG. 19 shows the surface pattern of the emboss 309. FIG. 19 is a cross-sectional view along line A-B in FIG. 17. As shown in FIG. 19, the convexo-concave pattern without a periodicity may be formed using a random convexo-concave surface which is formed by ground glass, sands hardened to give a plane surface, a tracing paper, or a suede (a kind of leather). A central line average roughness of the convexo-concave pattern is preferably about 5–500 μm.

4.2 Operation

The picture plane 315 of a liquid crystal television has numerous projection pixels 316 of rectangle periodically repeated in the vertical and the horizontal directions, which is to be projected onto a projection screen. If the emboss 309 formed on the surface of the projection screen has a pattern with concave portions of rectangles periodic in the horizontal and the vertical directions and with the same periodic direction as the arrangement direction of the projection pixels 316 (for example as disclosed in Japanese Laid-open Utility Model Publication No. Sho 64-40835), which has been used for movies, moire fringes would appear due to a mutual action between the projected pixels 316 and the convexo-concave pattern of the emboss 309 on the screen. This is a cause of loss of clearness of image.

The above problem will be solved by using a pattern with no periodicity, for example, a pattern of the satin or the graining as described above, for the convexo-concave pattern of the emboss 309 as in the present invention. Even with a periodicity, if the direction of period of the convexo-concave pattern of the emboss 309 is not in parallel with the arrangement direction of the pixels 316, or, if they are inclined to some extent to each other, the mutual interference is unlikely to occur, not causing the moire fringe phenomenon. This extent is an inclination of at least 15 degrees as described above. The upper limit of 75 degrees is determined because most convexo-concave patterns have bidirectional periods intersecting at an angle of 90 degrees and because one inclination over 75 degrees results in lowering the other inclination below 15 degrees. It is in general preferable that the inclination be set at 30 degrees or at 45 degrees to assure the above effect.

4.3 Specific Examples

Example 1

A white PVC calender sheet (DOP: 60 phr) of a thickness of 0.13 mm was used as a base material sheet 303. A reflection sheet 302, 303 was obtained by printing a reflection layer 302 with a sheen ink with a composition as described below by the gravure printing in a dry thickness of 3 μm on the PVC sheet.

| Sheen Ink | |
|---|---|
| Vehicle (PVC) | 100 parts by weight; |
| Pigment (titanium coating mica) | 20 parts by weight. |

A black PVC sheet (containing 60 phr of DOP as a plasticizer) of a thickness of 0.28 mm was used as a light absorbing layer 305. Superimposed in order thereon were a fibrous sheet 304 of glass fiber woven fabric, the above reflection sheet 302, 303, a translucent PVC sheet 301 (DOP: 60 phr) of a thickness of 0.15 mm formed by kneading about 2% by weight of a pearl pigment (titanium coating mica) in a plastic and extruding it, and an emboss plate of graining look. The materials were consolidated and embossed by heat press doubling.

The projection screen of the present invention thus obtained had peak gains of 2.16 in the vertical direction and of 1.84 in the horizontal direction. When an image of a liquid crystal television was projected onto the projection screen, a clear reflection image was observed thereon. This specific Example 1 corresponds to the reflection type projection screen as shown in FIG. 12.

Example 2

A white PVC calender sheet of a thickness of 0.20 mm as a base material sheet 303, a base plate 304 made of an acrylic resin of a thickness of 5 mm, and a translucent PVC sheet 301 of a thickness of 0.20 mm were prepared similarly as in Example 1.

A solid print was applied on the base material sheet 303 with a black ink using a pigment of a carbon black or the like to form a light absorbing layer 306. On a non-printed surface of the base material sheet 303 were superimposed the base plate 304 and the translucent sheet 301 provided with the reflection layer 302 of a thickness of 5 μm with the sheen ink of Example 1 in such a state that the reflection layer 302 was down. These materials were bonded together and embossed in the same manner as in Example 1. The emboss had line projections parallel to each other at a fine pitch, between which line projections, which were high at both ends and slightly low at the center, connected. The direction of the pattern was inclined at 45 degrees.

An outer frame 310 of a black line of a width of 3 cm was made by the silk screen printing with a black ink on the surface of the screen thus obtained, producing a reflection type projection screen of the present invention squared with a length of a diagonal line of 100 inches. A clear image was also observed as projected from a liquid crystal projector onto this screen. This specific Example 2 corresponds to the reflection type projection screen shown in FIG. 13.

4.4 Effect

The projection screen of the present invention can always provide a clear image without the nuisance of moire fringes when an image with an assembly of pixels repeated with a periodicity is projected. In addition, of course, the projection screen is useful for watching ordinary movies.

§5 First Embodiment of Production Process of Reflection Type Projection Screen

5.1 Fundamental Constitution

A first embodiment of the production process of the reflection type projection screen according to the present invention will be described with reference to FIGS. 20-25.

Figure 20:
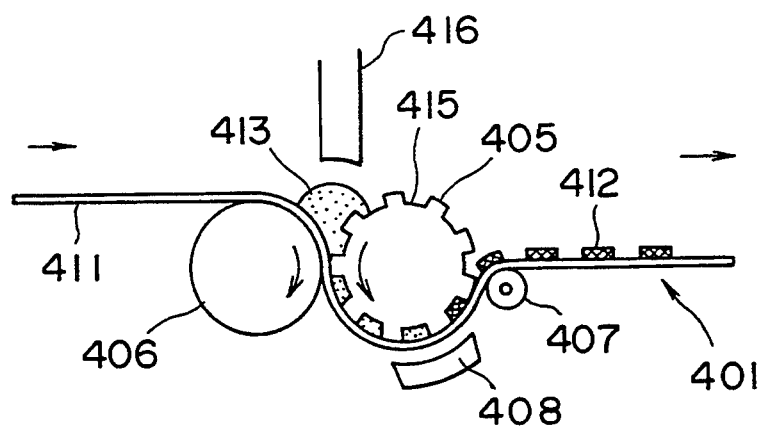
FIG. 20 is a side view showing a first embodiment of a production process of a reflection type projection screen according to the present invention.

This embodiment of the production process of the reflection type screen of the present invention comprises the following steps. In detail, as shown in FIG. 20, the steps are of rotating a rotary intaglio (master roll) 405 having a surface of fine convexo-concave pattern in lens form, of filling at least recess portions 415 of the rotary intaglio 405 with an ionizing radiation curing resin liquid 413 from a nozzle 416, and of urging a support sheet 411 of a transparent, flexible plastic running in the rotation direction of the rotary intaglio 405 in synchronism therewith, against the rotary intaglio 405 by a press roll 406. The support sheet 411 is thereafter fed downstream by a lead-on roll 407.

Figure 22:
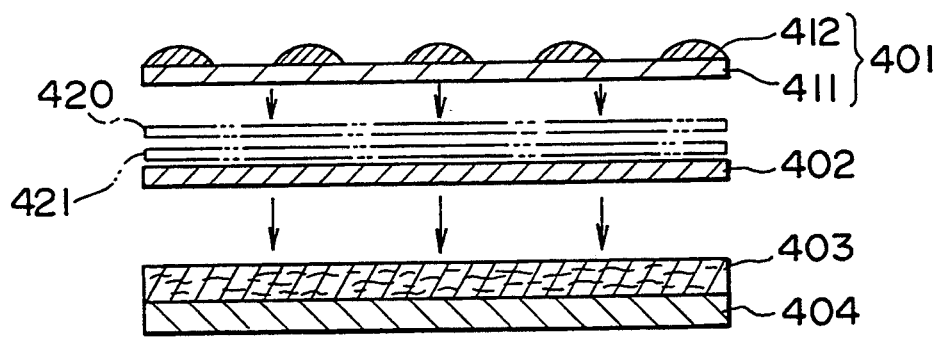
FIG. 22 is a sectional view showing a lamination step in a production process of the reflection type projection screen.

Then, as shown in FIG. 20, the rotary intaglio 405 is rotated while the support sheet 411 is kept in contact with the rotary intaglio 405. An ionizing radiation is irradiated from ionizing radiation irradiating means 408 to cure the ionizing radiation curing resin liquid 413, and simultaneously to cause the cured resin layer 412 and the support sheet 411 to adhere to each other. Then, the support sheet 411 is separated together with the cured resin layer 412 from the rotary intaglio 405, whereby a lens sheet 401 is produced, in which the fine convexo-concave cured resin layer 412 is formed in lens form on one face of the support sheet 411. Then, backing base materials 402, 403, 404 with properties of diffusion and reflection of light are laminated on the non-lens surface of the lens sheet 401, as shown in FIG. 22.

Figure 21:
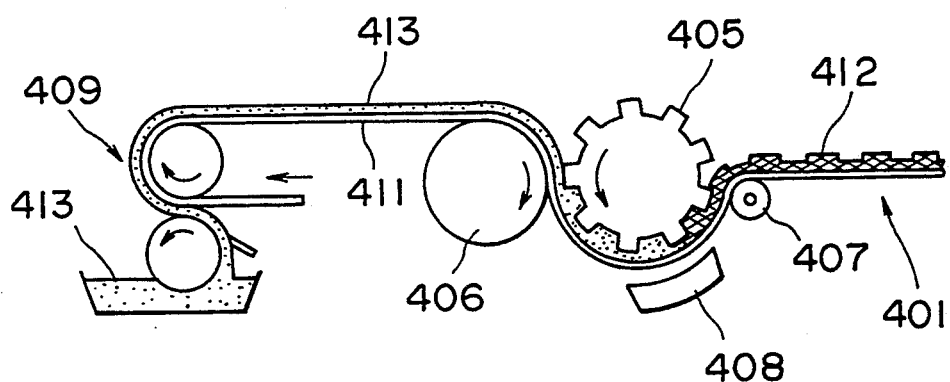
FIG. 21 is a side view showing a modification of the production process of the reflection type projection screen.

A modification embodiment of the production process of the reflection type screen of the present invention comprises the following steps. Namely, as shown in FIG. 21, there is a step of urging against the rotary intaglio 405 the support sheet 411 of a flexible plastic preliminarily coated with the ionizing radiation curing resin liquid 413 by coating means 419 so as to keep the coated surface in contact with the rotary intaglio 405.

Then, the rotary intaglio 405 is rotated while the support sheet 411 is kept in contact with the rotary intaglio 405. The ionizing radiation is irradiated from the ionizing radiation irradiating means 408 to cure the ionizing radiation curing resin liquid 413, and simultaneously to cause the cured resin layer 412 and the support sheet 411 to adhere to each other. Thus a lens sheet 401 is produced, in which the fine convexo-concave cured resin layer 412 is formed in lens form on one face of the support sheet 411. Then, backing base materials, 402, 403, 404 with properties of diffusion and reflection of light are laminated on the non-lens surface of the lens sheet 401, as shown in FIG. 22.

In FIG. 20, when the ionizing radiation curing resin liquid is supplied to fill each recess portion 415 of the rotary intaglio 405, the resin is supplied at a position where the support sheet 411 is urged against the rotary intaglio by the press roll 406 (between the rotary intaglio 405 and the press roll 406), whereby the resin fills the recess portion 415 with the rotation of the rotary intaglio 405. A more preferable technique is to fill each recess portion 415 of the rotary intaglio 405 with the resin liquid by using a nozzle 416 of T die type, which can readily prevent gas bubbles from entering the resin layer 412.

Figure 24:
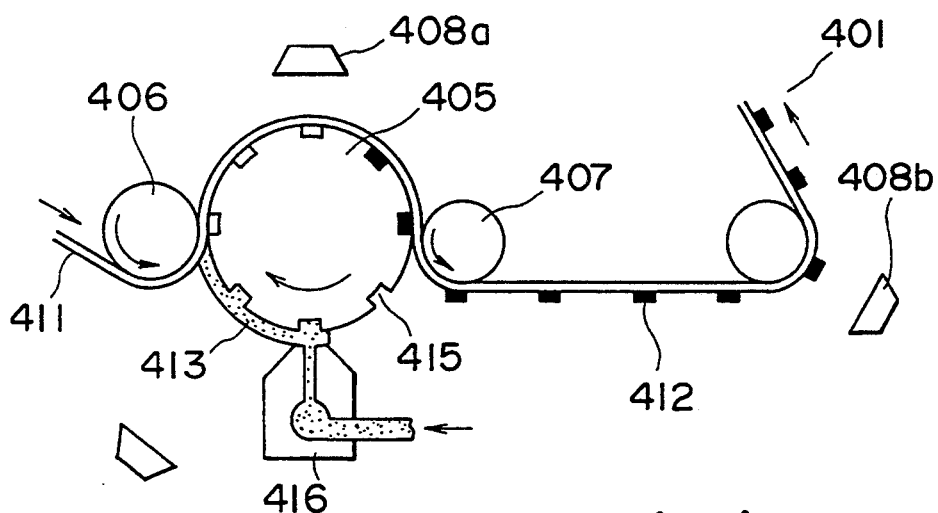
FIGS. 24(A) and 24(B) are side views showing another modification of the production process of the reflection type projection screen.
Figure 24:
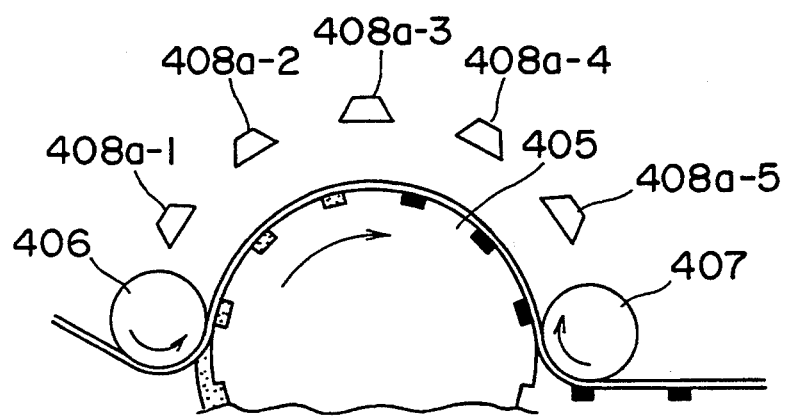
Figure 25A:
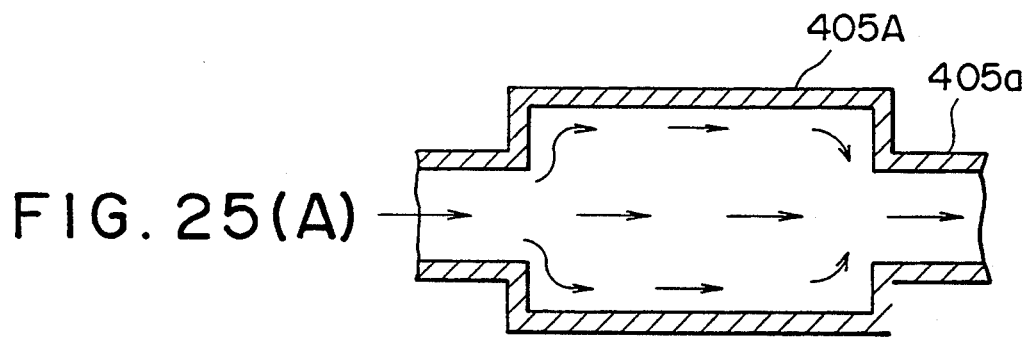
FIGS. 25(A) through 25(E) are sectional views showing examples of inside structures of the intaglio roll shown in FIG. 24.
Figure 25B:
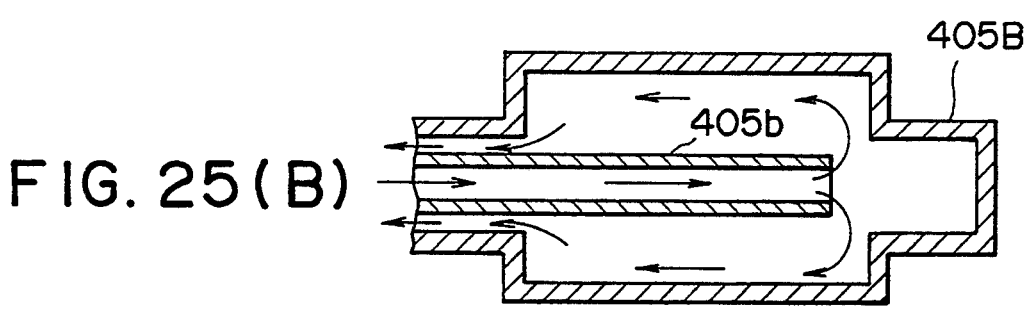
Figure 25C:
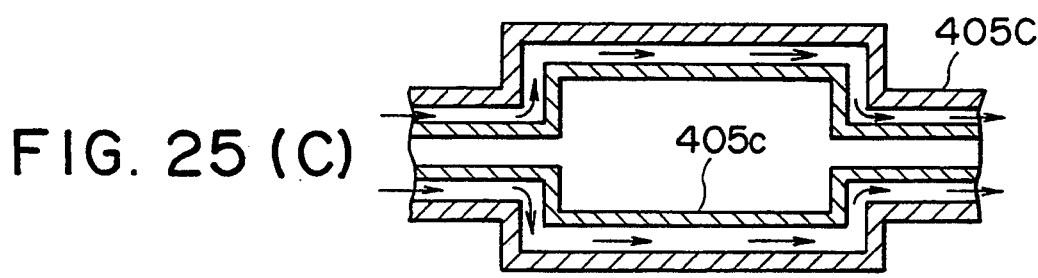
Figure 25D:
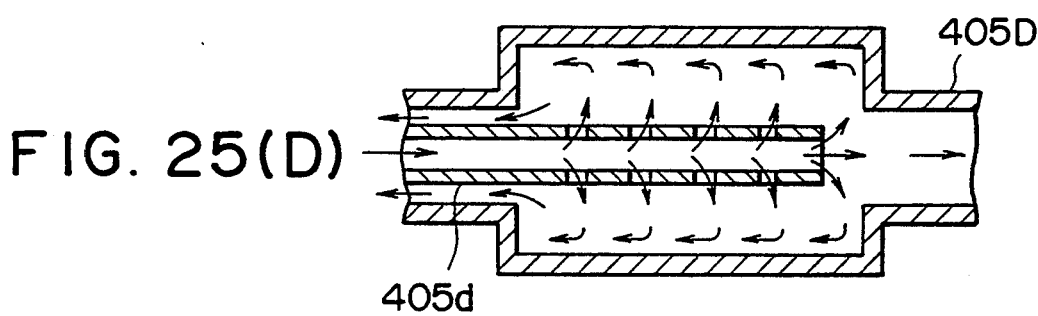
Figure 25E:
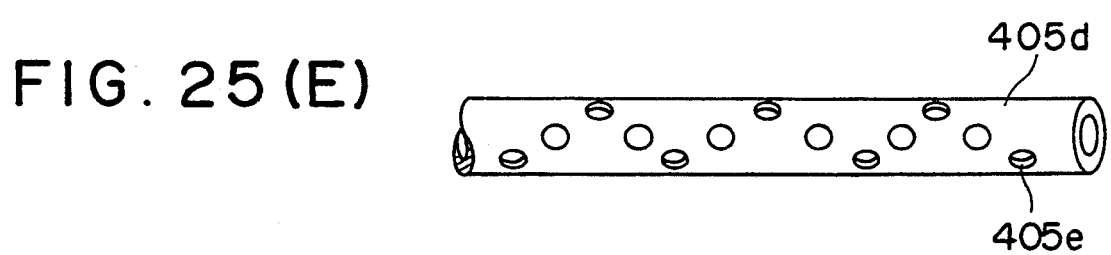

A most preferable production apparatus has an arrangement as shown in FIG. 24. This apparatus will be described with reference to FIG. 24 (A). A rotary intaglio 405 is provided with recesses 415 of lens form on a cylindrical printing material. The recesses 415 may be made by a method of direct lathe machining on the cylindrical printing material, by a method of cutting such as milling with a mill formed by the electroforming process, or by an electroforming process. Materials usable for the rotary intaglio 405 are metals such as copper, chromium, ion, and the like, synthetic resins such as NBR, epoxy, ebonite, and the like, and ceramics such as glass. The size of the rotary intaglio 405 is not specifically limited and may be suitably determined in accordance with a size of the screen to be produced. A drive apparatus (not shown) may be provided for the rotary intaglio 405 to rotate the same.

To control the viscosity of the resin liquid 413 at a predetermined value, as seen in rotary intaglios 405A-405D as shown in FIG. 25, a method may be employed to make the rotary intaglios 405A-405D hollow inside, to introduce and discharge a fluid as a heating medium such as water, oil, vapor and the like at an appropriate temperature, and to control the surface temperature of the intaglios at a suitable value. The viscosity of the resin liquid 413 decreases in general as it becomes hotter. A too high temperature causes decomposition or vaporization of the resin liquid 413. Therefore, a preferable temperature is about 15-50° C., though depending upon the resin.

Various arrangement as shown in FIG. 25 may be employed to introduce and discharge the fluid into and out of the rotary intaglios 405A-405D. Specifically, there is a method in which the fluid is forced to flow from one side to the other side of a rotation shaft 405a of the rotary intaglio 405A as shown in FIG. 25 (A). Also, there is a method as shown in FIG. 25 (B) in which a feed pipe 405b is inserted inside the rotary intaglio 405B, and the fluid is first fed through the feed pipe 405b to a fore end inside the rotary intaglio 405B and then returned along the internal wall surface of the rotary intaglio 405B. Further, there is a method as shown in FIG. 25 (C) in which an inner pipe 405C' having a figure similar to the rotary intaglio 405C is disposed inside the rotary intaglio, and the fluid is forced to flow between the rotary intaglio 405C and the inner pipe 405C'. Further, there is a method as shown in FIG. 25 (D) in which a feed pipe 405d with numerous openings 405e as shown in FIG. 25 (E) is inserted inside the rotary intaglio 405D, and the fluid ejected from the openings 405e of the feed pipe 405d is returned along the internal wall surface of the rotary intaglio 405D. The best method is an arrangement as shown in FIG. 25 (D) to uniformly adjust the surface temperature of the rotary intaglio.

Returning to FIG. 24 (A), the press roll 406 is for pressing the base material sheet 411, which is normally formed of a silicone rubber, an NBR, an EPT, or the like, with a diameter of about 140 mm. The press roll 406 and the lead-on roll 407 may be arranged to rotate with rotations of the rotary intaglio 405, but are preferably driven by respective drive devices.

In FIG. 24, another illuminating means 408b may be provided to make complete the curing of the ionizing radiation curing resin liquid by the ionizing radiation illuminating means 408a. It is desirable as means for coating the ionizing radiation curing resin liquid 413 on the rotary intaglio 405 to use a nozzle coating device 416 as shown in FIG. 24 (A). In the nozzle coating device 416, a nozzle of T die type has a rectangular or linear discharge pore of a predetermined size to cover a predetermined width out of the entire width of the rotary intaglio, and pressurizing means is provided for dispensing the ionizing radiation curing resin liquid in a curtain form pressurized, onto the rotary intaglio 405.

As shown in FIG. 21, the ionizing radiation curing resin liquid 413 may be applied as a coat on the support sheet 411, instead of being coated on the rotary intaglio 405, and then the coated surface on the support sheet 411 is urged by the press roll 406 against the rotary intaglio 405. By this method there is no mixing of gas bubbles into the resin. In order to reproduce faithfully a fine convexo-concave pattern, it is preferable that the resin liquid be coated on the rotary intaglio 405.

The ionizing radiation irradiating means 408a near the rotary intaglio 405 may be a single unit as shown in FIG. 24 (A), or it may be plural (five of 408a-1 to 408a-5) as shown in FIG. 24 (B) to cure the resin liquid 413 in the rotary intaglio 405 in multiple steps. By such an arrangement, a sufficient irradiation amount can be obtained even at a high traveling speed of the support sheet 411. Also, gradual curing is preferable in that it will reduce strain in the cured object of the resin liquid as well as a curl or a strain in the support sheet 411.

The ionizing radiation curing resin liquid 413 used here is selected from known resin liquids and preferably has a viscosity below 5000 cps, specifically of about 1000 cps, to readily spread inside the recesses 415 of the rotary intaglio 405. The viscosity of the resin liquid 413 can be adjusted by selection of a proper monomer, oligomer, or prepolymer, or by changing the temperature of the rotary intaglio 405. It is desirable that the ionizing radiation curing resin liquid 413 be used without a solvent solution if possible. This is because a solventless resin liquid 413 shows no volume contraction or no change in shape upon curing, accurately reproducing the convexo-concave pattern of the intaglio on the support sheet.

The ionizing radiation curing resin is a monomer, oligomer, or prepolymer having in its molecule an ethylenically unsaturated bonding or, an epoxy group or a thiol group, specifically, one selected from (meth)acrylates such as an urethane (meth)acrylate and a polyester (meth)acrylate, and unsaturated polyesters. In the case where it is to be cured by light or ultra violet light, a known photo reaction initiator is preferably added.

In the arrangement as shown in FIG. 21, the coating of the ionizing radiation curing resin liquid 413 onto the support sheet 411 can be carried out by known coating means 409 such as a roll coater or a knife coater. In this case, no matter what coating means is used, the coating is difficult without solvent dilution of the resin. Then, before the support sheet 411 is urged against the rotary intaglio 405, a solvent is preferably volatilized from the coating by heating by means of a heating apparatus (not shown). If necessary, ionizing radiation may be irradiated onto the support sheet 411 before it is urged against the rotary intaglio 405 to make the coating semi-cured so as to adjust the viscosity.

The irradiating means 408, 408a, 408b of the ionizing radiation is preferably an ultra-violet lamp, for example, a super-high-pressure mercury-vapor lamp, a high pressure mercury-vapor lamp, a low-pressure mercury-vapor lamp, a carbon arc, a black light lamp, or a metal halide lamp, which are simple in operation. Also, electron beam accelerators of various types may be used, for example, a Cockcroft-Walton accelerator, van de Graaff accelerator, a resonance-transformer type accelerator, an insulating core-transformer type accelerator, a linear accelerator, a dynatron type accelerator, a high-frequency type accelerator.

If a material of the support sheet 411 does not readily transmit ultra-violet light, for example, if a plastic sheet into which a lustrous pigment as described later is incorporated is used, the above electron beam accelerators may be used as the ionizing radiation irradiating means, or, the rotary intaglio 405 may be produced from a material such as a quartz glass or glass which transmits the ionizing radiation, and the ionizing radiation may be irradiated from ionizing radiation irradiating means disposed inside the rotary intaglio 405.

The plastics used for the transparent support sheet 411 and for the backing base materials may be any of flexible plastics. The material for the support sheet 411 is required to have transparency to a visible light, while the material for the base material sheet may be opaque. A representative material is a polyvinyl chloride. Particularly, a preferable material is a semirigid or soft polyvinyl chloride in which a plasticizer is added by about 10–60 parts by weight to 100 parts by weight of polyvinyl chloride. In addition, a polypropylene, a polyethylene, a polyethylene terephthalate, and a polycarbonate may be also used. The thickness of the support sheet 411 is preferably between 25 and 200 mm, while the thickness of the backing base material is preferably between 50 and 200 mm.

To obtain a high reflectivity and a moderate half-value angle, a lustrous pigment as later described may be added by about 0.5–10% by weight in the support sheet 411.

The fine recesses and protrusions 412 on the cured resin layer 412, that is, on the support sheet 411, may be so formed that the recess portions and the projection portions will have quadric surfaces or cubic surfaces in shape. Specifically, the surfaces may be (1) a so-called fly eye lens type reflection concave mirror in which are distributed, for example, spherical surfaces, elliptic surfaces, (portions of) a paraboloid of revolution, cones or truncated cones, pyramids or truncated pyramids, or small concave mirrors; (2) a lenticular type reflection concave mirror in which concave mirrors in the shape of a cylinder, a parabolic cylinder, an elliptic cylinder, or those cut into halves along symmetric axis thereof, are distributed all over the surface so that the vertical direction is coincident with the axial direction.

If it is desired that the screen be seen with the same luminance from any direction by isotropically diffusing the light in all directions up and down, right and left, and obliquely, the use of a spherical concave mirror group of (1) is suitable. In contrast, if the screen is for ordinary viewing not necessitating a vertical wide view field but necessitating a horizontal wide view field, the lenticular type concave mirror group of (2) is preferable because it can diffuse light of limited amount effectively toward necessary portions (in the front, the right, and the left directions). Normally, a light diffusion half-value angle in the horizontal plane (in the directions of the right and the left), which is an angle at which the reflectivity reduces to a half to that in a direction normal to the screen, should be 20 degrees or more, preferably about 60 degrees.

The surface pattern of the cured resin layer 412 can be an emboss pattern which is frequently used in conventional reflection type screens, for example, a pattern with waves intersecting at 90 degrees, or patterns of graining look and of hairline look.

The backing base materials 402, 403, 404 are constituted by laminating, from the side near the support sheet 411, the black or white opaque base material sheet 402, the fibrous sheet 403, and the light absorbing layer 404 in this order, as shown in FIG. 22. If an especially high reflectivity and an especially narrow light diffusion half-value angle are not required, one or both of the light diffusing layer and the light reflection layer may be omitted. Also, without such limitation, laminated from the side of the support sheet 411 are the fibrous sheet 403, the base material sheet 402, and the light absorbing layer 404 in this order.

To obtain the white opaque base material sheet 402, a white pigment such as fine powders of $TiO_2$ may be kneaded in a plastic for the base material sheet 402. Depending upon the reflection amount desired, a black resin sheet may be alternatively used.

The fibrous sheet 403 is for enhancing the dimensional stability of the screen. Specifically, if the screen is used as a wind-up screen, the fibrous sheet is required to prevent the screen pulled down from sagging. Also, if the screen is unwound in use for projection after storage in a wound condition, a remaining curling may cause an image projected to be warped. Thus, the fibrous sheet 403 is required to have ample elastic recovery and ample stiffness. A material to satisfy these requirements is a woven fabric or an unwoven fabric of glass fibers.

As shown in FIG. 22, in the case where the light absorbing layer 404 is laminated on the fibrous sheet 403 of glass fibers, laminated as the light absorbing layer 404 on the fibrous sheet 403 is a sheet obtained by incorporating a dark, for example, black, dark brown, or dark blue, pigment into the same plastic as the material for the base material sheet and forming it. The thickness of the sheet 404 is preferably equivalent to the total thickness of the base material sheet 402 and the support sheet 411, balancing the screen in the direction of thickness.

Figure 23:
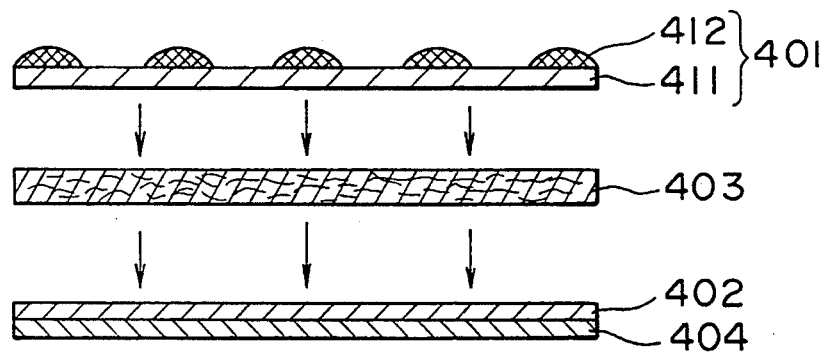
FIG. 23 is a sectional view showing another lamination step in a production process of the reflection type projection screen.

As shown in FIG. 23, if it is desired that the light absorbing layer 404 be provided on the base material sheet 402, the light absorbing layer 404 can be formed by a solid print with a dark ink on the base material sheet 402. The printing can be conducted by known means.

The lens sheet 401, the base material sheet 402, and the fibrous sheet 403 all may be simultaneously laminated. Alternatively, the base material sheet 402 and the fibrous sheet 403 may be first laminated to form a backing sheet, and the lamination and the lens sheet 401 may be then laminated. The order is arbitrary. The lamination process may be chosen from known techniques such as the dry laminate process and the fusion bonding process.

As shown in FIG. 22, if a clear projected image is desired to be seen under illumination of light from the sun or from an electric lamp as optical properties of the screen, one or both of the light diffusing layer 420 and the light reflection layer 421 should be disposed between the lens sheet 401 and the fibrous sheet 403 or the base material sheet 402. The light diffusing layer 420 is a sheet of a translucent, flexible plastic into which a lustrous pigment or calcite powder is incorporated. The plastic used for the light diffusing layer 420 may be the same plastic used for the base material sheet or for the support sheet.

Examples of the lustrous pigment are as follows: (a) materials called pearl pigments, specifically, ground inside portion of seashell, ground pearl, mica, finely divided particles of mica with $TiO_2$ or ion oxide being baked thereon; (b) metal powders, specifically, copper, aluminum, brass, bronze, gold, silver, preferably, of finely divided particles of 1–120 $\mu$m; (c) splinters of deposited plastic film, for example a material obtained by depositing a metal as listed above, ordinarily aluminum, onto a polyethylene terephthalate film and grinding it. These lustrous pigments are preferably scaly in shape. If the planes of the scaly bodies are arranged to be in parallel with the surface of the base material sheet, irregular reflection can be effected with a high luminance.

The calcite powder preferably has an average grain size of 2–20 $\mu$m and a size distribution as narrow as possible. For example, in case of an average grain size of 5 $\mu$m, the size distribution is such that more than 80% by weight fall within a range of 3–7 $\mu$m.

The amount of the lustrous pigment or the calcite powders added into the plastic for the light diffusing layer 420 is preferably 0.5–100% by weight, specifically about 2% by weight.

If the reflection layer is not provided, the thickness of the light diffusing layer 420 should be preferably between 0.04 and 0.8 mm, taking it into consideration that attenuation of reflection light amount is to be restricted to keep the projected image brighter. If the reflection layer is provided, the attenuation of the reflection light amount is low so that the thickness of the light diffusing layer is preferably between 0.05 and 1 mm, taking into consideration that the half-value angle is rather to be broadened by increasing the thickness of the light diffusing layer.

The lamination of the light diffusing layer 420 may be carried out in the same manner as that of other sheets. The support sheet may serve as the light diffusing layer, using a support sheet in which the above lustrous pigment or calcite powder is dispersed.

The light reflection layer 421 is provided by a solid print with an ink containing a lustrous pigment or calcite powder on the light diffusing layer 420 or the base material sheet 402 before the lamination of the respective sheets.

The ink used for printing of the light reflection layer 421 is an ink in which a lustrous pigment or calcite powder is dispersed in an ordinary ink vehicle. Examples of the vehicle are polyvinyl chlorides, polyvinyl chloride-polyvinyl acetate copolymers, acrylic resins, polyurethanes, and polyesters.

Although the rate of the lustrous pigment in the ink is preferably as high as possible, a too low rate of the vehicle makes difficult the formation of the print layer on the base material sheet. Thus, the composition of the ink is preferably 5–50 parts by weight of vehicle to 100 parts by weight of pigment. The thickness coated by printing is normally about 1–10 $\mu$m.

The ink in which such grains of lustrous pigment are dispersed tends to cause unevenness in printing. Thus, instead of a single printing to obtain a desired thickness, it is preferable to obtain a high reflection property of the light diffusing layer by a process comprising a step of printing a fraction of the desired thickness and repeating this step to obtain the total thickness desired in layers thereafter.

If the calcite powder is used, the composition of the ink, for the same reason as above, is preferably 10-100 parts by weight, specifically 10-50 parts by weight, of the vehicle to 100 parts by weight of the calcite powder.

The printing method may be one of known techniques, for example, printing methods such as the gravure process and the silk screen process, and coating methods such as the spray coat and the roll coat. A sufficient thickness of the print layer is 1 μm or more in a dry state.

5.2 Operation

The present invention employs, as a measure for forming a fine convexo-concave pattern on the surface of the screen, a method in which the ionizing radiation curing resin 413 is placed on the support sheet 411 in use of the rotary intaglio 405 in a printing manner, replacing the conventional embossing process. According to this method, since the convexo-concave pattern is formed with the fluid non-cured resin 413, and the resin is cured in a state controlled by the rotary intaglio 405, the fine convexo-concave pattern of the ionizing radiation curing resin can be formed on the support sheet 411 while accurately reproducing the pattern on the intaglio, consequently producing a reflection type screen with desired optical properties.

The production method of the present invention affords high productivity with continuous production of lens sheet as compared to a method of embossing screens one by one.

5.3 Specific Example

A rotary intaglio 405 of copper was prepared by forming a reversed convexo-concave pattern of the lenticular lens type by the electroforming process and chromium deposition on a surface thereof. As shown in FIG. 24, there were assembled a nozzle coating device 416 for filling recesses 415 of the rotary intaglio 405 with an ionizing radiation curing resin liquid 413, a press roll 406 for urging the support sheet 411 against the rotary intaglio 405, and a lead-on roll 407 for separating the support sheet 411 from the rotary intaglio 405, and five rows of high-pressure mercury-vapor lamps of two-lamp ozonization type (intensity 120 W/cm) were disposed in the rotation direction of the rotary intaglio 405 as ionizing radiation irradiating means 408a between the press roll 406 and the lead-on roll 407.

A colorless transparent sheet of biaxially oriented polyethylene terephthalate of a thickness of 25 μm was used as the support sheet 411. An ultra-violet curing resin liquid (ionizing radiation curing resin liquid) 413 (solventless type, viscosity of 1000 cps) containing as a main ingredient polyester acrylate polyfunctional monomers was applied thereon using the above device, thereby producing a lens sheet 404 having the cured resin layer 421 formed in lenticular lens pattern.

A black polyvinyl chloride sheet (DOP: 60 phr) of a thickness of 0.2 mm was used as the light absorbing layer 404 disposed on a back face of a fibrous sheet, and a woven fabric of glass fibers was used as the fibrous sheet 403. A white polyvinyl chloride sheet (DOP: 60 phr) of a thickness of 0.13 mm was used as the base material sheet 402 and a translucent sheet of thickness of 0.12 mm which was obtained by kneading 2% by weight of pearl pigment (titanium coating mica) in a polyvinyl chloride (DOP: 60 phr) and extruding it was used as the light diffusing layer.

The fibrous sheet 403, the base material sheet 402, and the light diffusing layer 420 were superimposed in order on the above light absorbing layer 404. These layers were integrally laminated by a heat press doubling process using a mirror plate laminate roll.

The above-mentioned lens sheet 401 was laminated on the light diffusing layer 420 of this lamination by the dry laminate process using a two-part liquid curing polyurethane adhesive, thereby obtaining a reflection type screen of the present invention by cutting into a predetermined size.

5.4 Effect

According to the method of the present invention, a reflection type screen can be produced with desired optical properties. The production process has high productivity and therefore advantageous in cost, as compared to that by the conventional emboss method.

§6 Second Embodiment of Production Process of Reflection Type Projection Screen

6.1 Outline of Reflection Type Projection Screen

A second embodiment of production process of the reflection type projection screen according to the present invention will now be described with reference to FIGS. 26 to 30.

Figure 26:
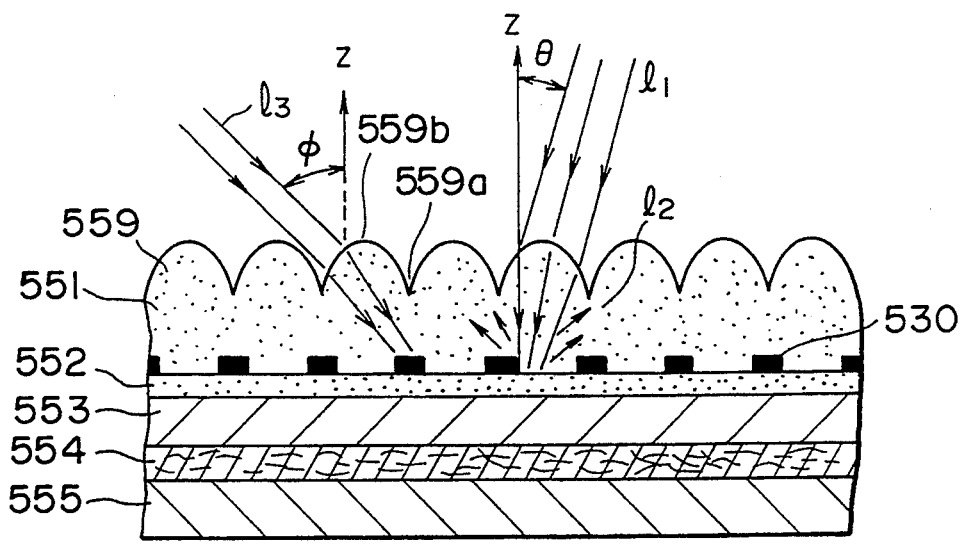
FIGS. 26 through 30(B) are a sectional view, a fragmentary perspective view, a sectional view, a schematic side view, and plan views indicating a second embodiment of the production process of the reflection type projection screen according to the present invention.
Figure 27:
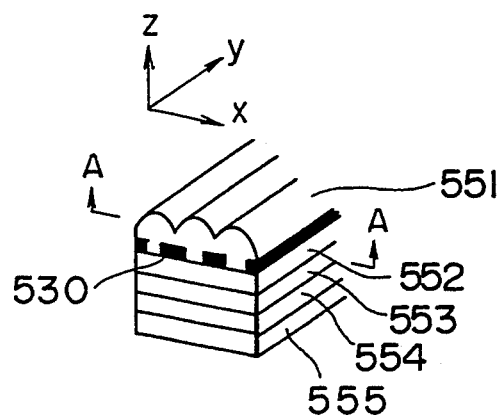

An outline of the reflection type projection screen will be first described with reference to FIGS. 26 to 28. FIGS. 26 and 27 show an embodiment of the reflection type projection screen. In FIGS. 26 and 27, the projection screen is provided in order on a light absorbing layer 555 of a dark plastic sheet, with a fibrous sheet 554 of glass fibers, a base material sheet 553 of a white, opaque, flexible plastic, a reflection layer printed with an ink containing a lustrous pigment or calcite powder, and a light diffusing layer 551 of a translucent, flexible plastic into which a lustrous pigment or calcite powder is incorporated, in which an emboss 559 is provided on the outer surface of the light diffusing layer 551. Among these layers, the reflection layer 552, the base material sheet 553, the fibrous sheet 554, and the light absorbing layer 555 constitute a backing base material of light diffusion and reflection type.

The plastics used for the base material sheet 553 and for the light diffusing layer 551 may be any of flexible plastics, for example, representatively a polyvinyl chloride, in addition, a polypropylene and a polyethylene. Specifically, a soft material is preferable, in which a plasticizer is added by about 50-60 parts by weight to 100 parts by weight of polyvinyl chloride. The thickness of the base material sheet 553 may be between 0.05 and 1 mm.

Examples of the lustrous pigment mixed into the light diffusing layer 551 and the reflection layer 552 are as follows: (a) materials called pearl pigments, specifically, ground inside portion of seashells, ground pearl, mica, finely divided particles of mica with $TiO_2$ or ion oxide baked thereon; (b) metal powders, specifically, copper, aluminum, brass, bronze, gold, silver, preferably, of finely divided particles of 1-120 μm; (c) splinters of deposited plastic film, for example a material obtained by depositing a metal as listed above, normally aluminum, onto a polyethylene terephthalate film and grinding it. These lustrous pigments are preferably scaly in shape. Planes of the scaly bodies are preferably arranged to be in parallel with the surface of the base material sheet, producing irregular reflection with a high luminance.

The calcite powder mixed into the light diffusing layer 551 and the reflection layer 552 preferably has an average grain size of 2-20 μm and a size distribution as narrow as possible. For example, in case of an average grain size of 5 μm, the size distribution is such that more than 80% by weight fall within a range of 3-7 μm.

The amount of the lustrous pigment or the calcite powder added to the plastic for the light diffusing layer 551 is preferably 0.5-10% by weight, particularly, about 2% by weight.

The ink used for forming the reflection layer 552 by printing onto the base material sheet 555 is an ink in which the lustrous pigment or the calcite powder is dispersed in an ordinary ink vehicle. Examples of the vehicle are polyvinyl chlorides, polyvinyl chloride-polyvinyl acetate copolymers, acrylic resins, polyurethanes, and polyesters. Although the proportion of the lustrous pigment in the ink is preferably as high as possible, a too low proportion of the vehicle makes the formation of the reflection layer 552 on the base material sheet 553 difficult. A preferable composition of the ink is 5-50 parts by weight of the vehicle to 100 parts by weight of the pigment. The thickness coated by printing is ordinarily about 1-10 μm.

The ink in which such grains of lustrous pigment are dispersed tends to cause unevenness in printing. Thus, instead of a single printing to obtain a desired thickness, it is preferable to obtain a high reflection property of the light diffusing layer 551 by repetitive printings each of a fraction of the thickness desired to obtain the desired thickness in layers.

If the calcite powder is used, the composition of the ink, for the same reason as above, is preferably 10-100 parts by weight, particularly 10-50 parts by weight, of the vehicle to 100 parts by weight of the calcite powder.

The printing may be carried out by one of the known techniques, for example, printing methods such as the gravure process or the silk screen process, and coating methods such as the spray coating or the roll coating. A sufficient thickness of the print layer is 1 μm or more in a dry state.

If the reflection layer 552 is not provided, a thickness of the light diffusing layer 551 is preferably between 0.04 and 0.8 mm, taking into consideration that an attenuation amount of reflection light is kept as small as possible to maintain a projected image brighter. If the reflection layer 552 is provided, the attenuation amount of reflection light is little, and therefore the thickness is preferably between 0.05 and 1 mm, considering that the thickness of the light diffusing layer should be rather increased to broaden the half-value angle.

The fibrous sheet 554 is for enhancing the dimensional stability of the screen. If the screen is used as a wind-up screen, the fibrous sheet is required to prevent the screen pulled down from sagging. Also, when the screen is unwound in use for projection after storage in a wound condition, a remaining curling may cause an image projected to be warped. Therefore, the fibrous sheet 554 is required to have ample elastic recovery and ample stiffness. Materials to satisfy these requirements are a woven fabric or an unwoven fabric of glass fibers and plastic sheets of polyester and of cellulose triacetate which are provided with many small pores.

The plastic sheet for the light absorbing layer 555 is obtained by incorporating a dark, for example, black, dark brown, or dark blue, pigment into the same plastic material as the base material sheet 553, and by forming it. The thickness of the sheet 555 is preferably equivalent to the total thickness of the base material sheet 553, the reflection layer 552, and the light diffusing layer 551, balancing the screen in the direction of the thickness.

Also, as shown in FIGS. 26 and 27, the emboss 559 having a convexo-concave pattern of lenticular lens type on the surface of the light diffusing layer 551 and light absorbing stripes 530 are disposed at positions other than areas on which light converged by the emboss 559 of lenticular lens type is projected (positions corresponding to concave portions 559a of the emboss 559, because a projection light ordinarily enters the screen in the normal direction thereto) on the surface of the reflection layer 552 on the side of the light diffusing layer 551. There are no light absorbing stripes 530 provided at portions corresponding to convex portions 559b of the emboss 559. In other words, since the projection light enters the projection screen nearly in the normal direction thereto (vertical incidence), the concave portions 559a are regions other than those on which the projection light is converged.

The emboss 559 longitudinally extends in the y direction in FIG. 27, and the light absorbing stripes 530 also correspondingly extend in ribbon form in the y direction. FIG. 26 is a section indicated by A—A in FIG. 27.

The light absorbing stripes 530 can be formed by printing or coating with an ink or a coat containing a black pigment, for example, carbon black. They can also be formed by metal plating, vapor deposition, sputtering, or the like, using a black metal or metal oxide such as a black chromium deposition.

By providing the light absorbing stripes 530, unnecessary stray lights such as light from an electric lamp and outside sun beam can be absorbed by the light absorbing stripes 530, thereby presenting a clear projection picture plane with a high contrast.

That is, in FIG. 26, a projection light $l_1$ enters the light diffusing layer 551 at a small incident angle $\theta$ (in a condition close to normal incidence). The projection light $l_1$ is converged thereafter by the emboss 559 of lenticular lens type, and then reaches a position corresponding to a convex portion 559b of the emboss 559 of the reflection layer 552. Then, the projection light $l_1$ is diffusion-reflected by the reflection layer 552, and goes out of the light diffusing layer 551 as a reflection light $l_2$ toward the audience.

On the other hand, an unnecessary stray light $l_2$ enters the light diffusing layer 551 at a large incidence angle $\phi$. The stray light $l_2$ is converged by the emboss 559, and reaches a position corresponding to a concave portion 559a of the emboss on the reflection layer 552. Since a light absorbing stripe 530 is provided at this position, the stray light $l_2$ is absorbed by the light absorbing stripe 530 without going out toward the audience. For this reason, a clear projection image can be obtained.

The position of the light absorbing stripes 530 is not limited to the above-described position, but may be any portion excluding the portion on which the projection light $l_1$ is focused. Accordingly, the stripes may be designed according to the curvature, the shape, and the reflectivity of the convexo-concave pattern of the emboss 559, an incident angle $\theta$ of the projection light $l_1$, and the incident angle $\phi$ of the stray light $l_2$.

Another embodiment of the reflection type projection screen will be described with reference to FIG. 28.

Figure 28:
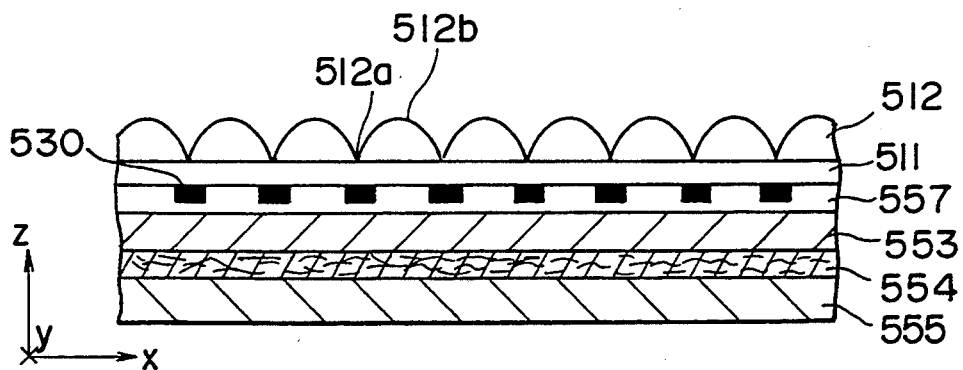

The reflection type projection screen shown in FIG. 28 has backing base materials 553, 554, 555 formed by laminating a light absorbing layer 555, a fibrous sheet 554, and a base material sheet 553 in order. A transparent support sheet 551 is positioned through a transparent adhesive layer 555 on the backing base materials 553, 554, 555, and formed on the support sheet 511 is a convexo-concave pattern lens surface having concave portions 512a and convex portions 512b by an ionizing radiation curing resin 512. The longitudinal direction of the convexo-concave pattern lens surface 512a, 512b is along the y direction in FIG. 28.

Also, light absorbing stripes 530 are provided at positions corresponding to the concave portions 512a of the convexo-concave pattern lens surface on the surface of the support sheet 511 on the side of the base material sheet 553.

In the reflection type projection screen as shown in FIG. 28, the light absorbing layer 555, the fibrous sheet 554, the base material sheet 553, and the light absorbing stripes 530 are the same as those shown in FIGS. 26 and 27.

As described above, if the convexo-concave lens surface has a pattern other than the lenticular lens, the light absorbing stripes 530 are not necessarily of stripe form.

The ionizing radiation curing resin 512 used here may be chosen from known resins, preferably one having a viscosity below 5000 cps, particularly of 1000 cps. The viscosity of the resin is determined by selection of a suitable monomer, oligomer, or prepolymer.

The ionizing radiation curing resin is a monomer, oligomer, or prepolymer having in its molecule an ethylenically unsaturated bonding or, an epoxy group or a thiol group, specifically, one selected from (meth)acrylates such as an urethane (meth)acrylate and a polyester (meth)acrylate, and unsaturated polyesters. If it is cured by light or ultra violet light, a known photo reaction initiator should be added.

The plastic used as the material for the transparent support sheet 511 may be any of flexible plastics. The support sheet 511 is required to have transparency to a visible light. A polyvinyl chloride is a typical example of the material. Particularly, a semirigid or soft material is preferable, in which a plasticizer is added by about 10-60 parts by weight to 100 parts by weight of polyvinyl chloride. In addition, a polypropylene, a polyethylene, a polyethylene terephthalate, and a polycarbonate is preferably used. The thickness of the support sheet 511 is preferably between 25 and 200 mm.

To obtain a high reflectivity and a moderate half-value angle, about 0.5-10% by weight of lustrous pigment may be added to the support sheet.

6.2 Outline of Production Method

Figure 29:
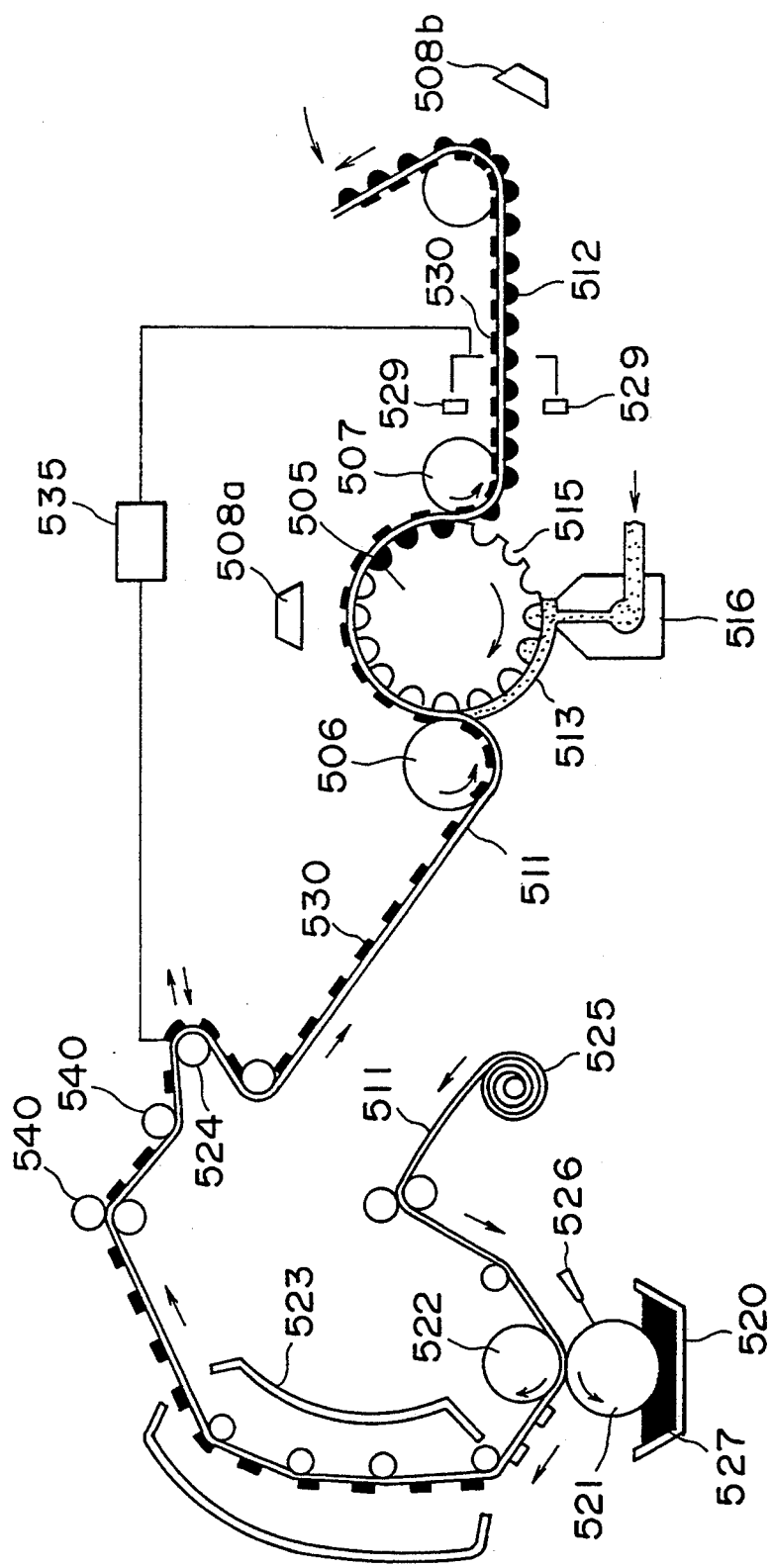
Figure 30A:
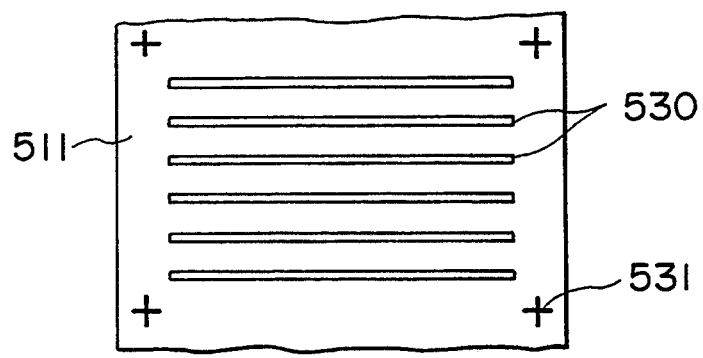
Figure 30B:
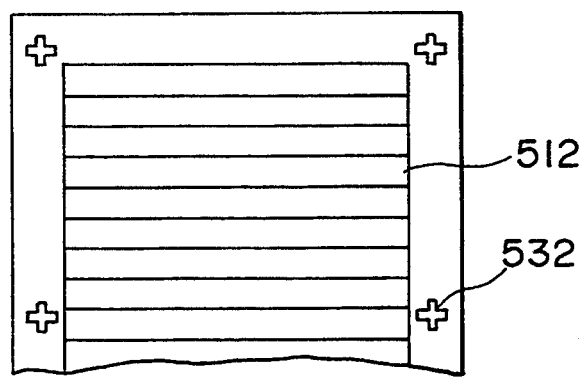

With reference to FIGS. 29 and 30 the production process of the reflection type projection screen (see FIG. 28) having the ionizing radiation curing resin will now be described.

FIG. 29 is a drawing showing a production apparatus of the reflection type projection screen and FIG. 30 is a drawing indicating the position aligning between the front and the back of the projection screen.

As shown in FIG. 29, a support sheet 511 fed from a sheet feed device 525 is directed to an ink pan 520 containing a black ink 527 for printing of light absorbing stripes 530. A gravure printing roll 521 is located in the ink pan 527, and light absorbing stripes 530 are formed by printing with a black ink on one surface of the support sheet 511 between the gravure printing roll 521 and a press roll 522. The light absorbing stripes 530 are printed at a predetermined positions on the support sheet 511.

Then, the support sheet 511 enters a drier 523, where the light absorbing stripes 530 are dried to become solid. The support sheet 511 then passes rolls 540, 540 and a compensator roll 524, and reaches a press roll 506, where the other surface of the support sheet 511 is urged against a rotary intaglio 505 by the press roll 506.

The rotary intaglio 505 is provided with recesses 515 of lens form on a cylindrical printing material. The recesses 515 may be made by a method of direct lathe machining on the cylindrical printing material, by a method of cutting such as milling with a mill formed by the electroforming process, or by the electroforming process. Materials usable for the rotary intaglio 505 are metals such as copper, chromium, ion, and the like, synthetic resins such as NBR, epoxy, ebonite, and the like, and ceramics such as glass. The size of the rotary intaglio 505 is not specifically limited, and may be suitably determined in accordance with a size of the screen to be produced. A drive apparatus is provided for the rotary intaglio 505 to rotate the same in synchronism with the support sheet 511, though not shown.

At an outer periphery of the rotary intaglio 505, an ionizing radiation curing resin liquid 513, for example, an ultra violet light curing resin liquid composed of a formulation mainly containing a prepolymer of polyester acrylate and an acrylate monomer is supplied from a T die type nozzle 516. Thereafter, the ionizing radiation curing resin liquid 513 is supplied into the concave portions 515 of the rotary intaglio 505.

Ultra-violet light is projected toward the support sheet 511 urged against the outer periphery of the rotary intaglio 505 from an ultra violet light source (high-pressure mercury-vapor lamp or the like) 508a disposed outside thereof. In this case, the ionizing radiation curing resin liquid 513 is cured to form a convexo-concave pattern lens surface of the ionizing radiation curing resin 512 with concave portions 512a and convex portions 512b. Simultaneously, the convexo-concave pattern lens plane is bonded to the support sheet 511.

Thereafter, the support sheet 511 and the ionizing radiation curing resin 512 of convexo-concave pattern lens plane are released by a lead-on roll 507 from the rotary intaglio 505. Then, a further ultra-violet light is irradiated by an additional ultra violet light source 508b toward the ionizing radiation curing resin 512 on the support sheet 511, fully curing the ionizing radiation curing resin 512. Of course, the irradiation by the light source 508b may be omitted, if the curing of the cured resin 512 is sufficient only by the ionizing radiation source 508a.

Next, aligning between the light absorbing stripes 530 and the ionizing radiation curing resin 512 constituting the convexo-concave pattern lens plane will be described.

As shown in FIG. 30, upon the printing of the light absorbing stripes 530 on the support sheet 511, first register marks 531 are simultaneously printed (FIG. 30 (A)). Further, upon the formation of the ionizing radiation curing resin 512 on the support sheet 511, second register marks 532 are simultaneously formed (FIG. 30 (B)).

Then, the first register marks 531 and the second register marks 532 are detected by paired optical sensors 529, 529 disposed above and below the sheet on the downstream side of the rotary intaglio 505. If there is an offset between the first register mark 531 and the second register mark 532, the compensator roll 524 is moved by a control device 535 so as to increase or decrease the path length of the support sheet 511, thereby correcting (registering) the offset between the first and the second register marks 531 and 532.

Instead of the paired optical sensors 529, 529, a pair of television cameras may be used for detecting the first and the second register marks 531 and 532.

An offset in a direction of width of the support sheet 511 may be corrected by moving the gravure printing roll 521 and the rotary intaglio 505 in the direction of width.

Next, on the support sheet 511 having the ionizing radiation curing resin 512 and the light absorbing stripes 530, backing base materials 553, 554, 555 comprised of a light absorbing layer 555, a fibrous sheet 554, and a base material sheet 553 are laminated through an adhesive layer 557, producing a reflection type screen (FIG. 28).

Industrial Application

According to the present invention, a reflection type projection screen which has a suitable diffusing power and reflectivity and is easily handled is readily obtained. Such a reflection type projection screen is used for projection of movies or the like.

We claim:

1. A reflection type projection screen provided in order with a light absorbing layer (5) of a dark plastic sheet, a fibrous sheet (4) of glass fibers, a base material sheet (3) of a white, opaque, flexible plastic, and a light diffusing layer (1) of a translucent, flexible plastic into which a lustrous pigment or calcite powder is incorporated, wherein a convexo-concave emboss (9) is formed on the outer surface of the light diffusing layer (1).

2. A reflection type projection screen according to claim 1, wherein an outside frame (10) printed with a dark ink is provided on the outer periphery of the outer surface of the light absorbing layer (1).

3. A reflection type projection screen according to claim 1, wherein a light absorbing portion (11) is provided at a position corresponding to each concave portion (9a) of the emboss (9) on the surface of the base material sheet (3) on the side thereof adjoining the light diffusing layer (1).

4. A reflection type projection screen provided in order with a light absorbing layer (5) of a dark plastic sheet, a fibrous sheet (4) of glass fibers, a base material sheet (3) of a white, opaque, flexible plastic, a irregular reflection layer (2) printed with an ink containing a lustrous pigment or calcite powder, and a light diffusing layer (1) of a translucent, flexible plastic into which a lustrous pigment or calcite powder is incorporated, wherein a convexo-concave emboss (9) is formed on the outer surface of the light diffusing layer (1).

5. A reflection type projection screen according to claim 4, wherein an outside frame (10) printed with a dark ink is provided on the outer periphery of the outer surface of the light absorbing layer (1).

6. A reflection type projection screen according to claim 5, wherein a light absorbing portion (11) is provided at a position corresponding to each concave portion (9a) of the emboss (9) on the surface of the irregular reflection layer (2) on the side thereof adjoining the light diffusing layer (1).

7. A reflection type projection screen provided in order with a light absorbing layer (6) of a solid print layer of a dark ink, a base material sheet (3) of a white, opaque, flexible plastic, a fibrous sheet (4) of glass fibers, and a light diffusing layer (1) of a translucent, flexible plastic into which a lustrous pigment or calcite powder is incorporated, wherein a convexo-concave emboss (9) is formed on the outer surface of the light diffusing layer (1).

8. A reflection type projection screen according to claim 7, wherein an outside frame (10) printed with a dark ink is provided on the outer periphery of the outer surface of the light absorbing layer (1).

9. A reflection type projection screen according to claim 7, wherein a light absorbing portion (11) is provided at a position corresponding to each concave portion (9a) of the emboss (9) on the surface of the fibrous sheet (4) on the side thereof adjoining the light diffusing layer (1).

10. A reflection type projection screen provided in order with a light absorbing layer (6) of a solid print layer of a dark ink, a base material sheet (3) of a white, opaque, flexible plastic, a fibrous sheet (4) of glass fibers, a irregular reflection layer (2) printed with an ink containing a lustrous pigment or calcite powder, and a light diffusing layer (1) of a translucent, flexible plastic into which a lustrous pigment or calcite powder is incorporated, wherein a convexo-concave emboss (9) is formed on a surface of the light diffusing layer (1).

11. A reflection type projection screen according to claim 10, wherein an outside frame (10) printed with a dark ink is provided on the outer periphery of the outer surface of the light absorbing layer (1).

12. A reflection type projection screen according to claim 10, wherein a light absorbing portion (11) is provided at a position corresponding to each concave portion (9a) of the emboss (9) on the surface of the irregular reflection layer (2) on the side thereof adjoining the light absorbing layer (1).

13. A reflection type projection screen provided in order with a base material (103) with both faces being dark and a light diffusing layer (101) made with a translucent plastic sheet into which a platelet-shaped lustrous pigment (102) is incorporated.

14. A reflection type projection screen according to claim 13, wherein the base material (103) comprises a lamination of a backing sheet (104) of a dark plastic sheet, a fibrous sheet (105) of glass fibers, and a middle sheet (106) of a dark plastic sheet.

15. A reflection type projection screen according to claim 13, wherein a convexo-concave emboss (109) is provided on the outer surface of the light diffusing layer (101).

16. A reflection type projection screen according to claim 15, wherein a light absorbing portion (111) is provided at a position corresponding to each concave portion (109a) of the emboss (109) on the surface of the base material (103) on the side thereof adjoining the light absorbing layer (101).

17. A reflection type projection screen comprising a flexible sheet, wherein a plurality of small openings (208) are provided at least at a position in the vicinity of a speaker.

18. A reflection type projection screen provided in order with a light absorbing layer (205) of a dark plastic sheet, at least one (204) of a fibrous sheet with flexibility and a base plate with stiffness, a base material sheet (203) of a white, opaque, flexible plastic, a irregular reflection layer (202) printed with an ink containing a lustrous pigment or calcite powder, and a light diffusing layer (201) of a translucent, flexible plastic containing a lustrous pigment or calcite powder, wherein a convexo-concave emboss (209) is provided on the outer surface of the light diffusing layer (201) and wherein a plurality of small openings (208) are provided at least at a position in the vicinity of a speaker (212) located behind the light absorbing layer (205) through which openings sounds from the speaker can pass.

19. A reflection type projection screen according to claim 18, wherein an outside frame (210) printed with a dark ink is provided on the outer periphery of the outer surface of the light absorbing layer (201).

20. A reflection type projection screen according to claim 18, wherein a light absorbing portion (211) is provided at a position corresponding to each concave portion (209a) of the emboss (209) on the surface of the irregular reflection layer (202) on the side thereof adjoining the light absorbing layer (201).

21. A reflection type projection screen provided in order with a light absorbing layer (206) of a solid print layer of a dark ink, a base material sheet (203) of a white, opaque, flexible plastic, at least one (204) of a fibrous sheet with flexibility and a base plate with stiffness, a irregular reflection layer (202) printed with an ink containing a lustrous pigment or calcite powder, and a light diffusing layer (201) of a translucent, flexible plastic containing a lustrous pigment or calcite powder, wherein a convexo-concave emboss (209) is provided on the outer surface of the light diffusing layer (201) and wherein a plurality of small openings (208) are provided at least at a position in the vicinity of a speaker (212) located behind the light absorbing layer (206) through which openings sounds from the speaker can pass.

22. A reflection type projection screen according to claim 21, wherein an outside frame (210) printed with a dark ink is provided on the outer periphery of the ourwe surface of the light absorbing layer (201).

23. A reflection type projection screen according to claim 21, wherein a light absorbing portion (211) is provided at a position corresponding to each concave portion (209a) of the emboss (209) on the surface of the irregular reflection layer (202) on the side thereof adjoining the light absorbing layer (201).

24. A reflection type projection screen provided in order with a light absorbing layer (305) of a dark plastic sheet, at least one (304) of a fibrous sheet with flexibility and a base plate with stiffness, a base material sheet (303) of a white, opaque, flexible plastic, a irregular reflection layer (302) printed with an ink containing a lustrous pigment or calcite powder, and a light diffusing layer (301) of a translucent, flexible plastic containing a lustrous pigment or calcite powder, wherein a convexo-concave emboss (309) is provided on the outer surface of the light diffusing layer (301) and wherein the convexo-concave pattern of the emboss (309) has either no periodicity or a periodicity with a periodic direction of the convexo-concave pattern inclined at an angle of 15–75 degrees to a direction of arrangement of projection pixels (316).

25. A reflection type projection screen according to claim 24, wherein an outside frame (310) printed with a dark ink is provided on the outer periphery of the outer surface of the light absorbing layer (301).

26. A reflection type projection screen according to claim 24, wherein a light absorbing portion (311) is provided at a position corresponding to each concave portion (309a) of the emboss (309) on the surface of the reflection layer (302) on the side thereof adjoining the light absorbing layer (301).

27. A reflection type projection screen provide in order with a light absorbing layer (306) of a solid print layer of a dark ink, a base material sheet (303) of a white, opaque, flexible plastic, at least one (304) of a fibrous sheet with flexibility and a base plate with stiffness, a irregular reflection layer (302) printed with an ink containing a lustrous pigment or calcite powder, and a light diffusing layer (301) of a translucent, flexible plastic containing a lustrous pigment or calcite powder, wherein a convexo-concave emboss (309) is provided on a surface of the light diffusing layer (301) and wherein the convexo-concave pattern of the emboss (309) has either no periodicity or a periodicity with a periodic direction of the convexo-concave pattern inclined at an angle of 15–75 degrees to a direction of arrangement of projection pixels (316).

28. A reflection type projection screen according to claim 27, wherein an outside frame (310) printed with a dark ink is provided on the outer periphery of the outer surface of the light absorbing layer (301).

29. A reflection type projection screen according to claim 27, wherein a light absorbing portion (311) is provided at each position corresponding to a concave portion (309a) of the emboss (309) on the surface of the irregular reflection layer (302) on the side thereof adjoining the light absorbing layer (301).

30. A process for producing a reflection type screen, comprising:
   rotating a rotary intaglio (405) with a surface having a fine convexo-concave pattern in lens form, filling at least a recess portion (415) of the rotary intaglio with an ionizing radiation curing resin liquid (413), and pressing against the rotary intaglio (405) a support sheet (411) of a transparent, flexible plastic traveling in the rotation direction of the rotary intaglio in synchronism therewith;
   rotating the rotary intaglio (405) so as to keep the support sheet (411) in contact with the rotary intaglio (405), and irradiating said ionizing radiation curing resin liquid (413) with an ionizing radiation to cure the resin liquid (413) and simultaneously to effect adhesion between the cured resin layer (412) thus obtained and the support sheet (411);
   separating the support sheet (411) together with the cured resin layer (412) from the rotary intaglio (405) to thereby make a lens sheet (401) in which a fine convexo-concave cured resin layer (412) in lens form is formed on one face of the support sheet (411); and
   laminating a backing base material (402, 403, 404) with light diffusing and reflecting properties on the non-lens face of the lens sheet (401).

31. A process for producing a reflection type screen, comprising:
   coating an ionizing radiation curing resin liquid (413) on a support sheet (411) of a transparent and flexible plastic traveling in the rotation direction of a rotary intaglio (405) in synchronism therewith and pressing the support sheet (411) against the rotary intaglio (405) with a surface having a fine convexo-concave pattern in lens form so as to keep a face of the sheet (411) coated in contact with the rotary intaglio (405);
   rotating the rotary intaglio (405) so as to keep the support sheet (411) in contact with the rotary intaglio (405), and irradiating said ionizing radiation curing resin liquid (413) with an ionizing radiation to cure the resin liquid (413) and simultaneously to effect adhesion between the cured resin layer (412) thus obtained and the support sheet (411);

separating the support sheet (411) together with the cured resin layer (412) from the rotary intaglio (405) to thereby make a lens sheet (401) in which a fine convexo-concave cured resin layer (412) in lens form is formed on one face of the support sheet (411); and laminating a backing base material (402, 403, 404) with light diffusing and reflecting properties on the non-lens face of the lens sheet (401).

32. An apparatus for producing a reflection type screen, comprising: a rotary intaglio (405) with a surface thereof having a fine convexo-concave pattern in lens form, a press roll (406) for pressing a support sheet (411) of a plastic against the outer circumference of the rotary intaglio (405), a nozzle (416) for filling recesses (415) of the rotary intaglio (405) with an ionizing radiation curing resin (413), and ionizing radiation irradiating means (408) for irradiating an ionizing radiation toward the support sheet (411) wound around the outer circumference of the rotary intaglio (405).

33. An apparatus for producing a reflection type screen, comprising: a rotary intaglio (405) with a surface thereof having a fine convexo-concave pattern in lens form, a press roll (406) for pressing a support sheet (411) of a plastic against the outer circumference of the rotary intaglio (405), coating means (409) for preliminarily coating an ionizing radiation curing resin (413) on the face of the support sheet (411) on the side of the rotary intaglio (405), and ionizing radiation irradiating means (408) for irradiating an ionizing radiation toward the support sheet (411) wrapped around the outer circumference of the rotary intaglio (405).

34. A reflection type projection screen provided in order with a backing base material (552, 553, 554, 555) of light diffusing and reflecting type, and a light diffusing layer (551) made of a translucent plastic, wherein a convexo-concave emboss (559) is provided on the surface of the light diffusing layer (551), and wherein a light absorbing portion (530) is provided at a position corresponding to each concave portion (559a) of the emboss (559) on the face of the base material adjoining the light diffusing layer.

35. A reflection type projection screen provided in order with a backing base material (553, 554, 555) of light diffusing and reflecting type, a transparent support sheet (511), and an ionizing radiation curing resin (512), wherein a convexo-concave lens surface (512a, 512b) is formed on the ionizing radiation curing resin (512), and wherein a light absorbing portion (530) is provided at a position corresponding to each concave portion (512a) of the convexo-concave lens surface on the face of the transparent support sheet (511) adjoining the base material (553, 554, 555).

36. A process for producing a reflection type screen, comprising:

printing a light absorbing portion (530) with a light absorbing ink (527) on one face of a support sheet (511) of a transparent, flexible plastic;

rotating a rotary intaglio (505) with a surface having a fine convexo-concave pattern in lens form, filling at least recesses portion (515) of the rotary intaglio with an ionizing radiation curing resin liquid (513), letting the support sheet (511) travel in the rotation direction of the rotary intaglio in synchronism therewith, and pressing the other face of the support sheet against said rotary intaglio (505);

rotating the rotary intaglio (505) so as to keep the support sheet (511) in contact with the rotary intaglio (505), and irradiating the ionizing radiation curing resin with an ionizing radiation to cure said curing resin and simultaneously to effect adhesion between the cured resin layer (512) thus obtained and the support sheet (511);

separating the support sheet (511) together with the cured resin layer (512) from the rotary intaglio (505), printing light absorbing stripes (530) on one face of the support sheet (511), and producing a lens sheet (511, 512) provided with the cured resin layer having a convexo-concave lens surface in which a concave portion is located at a position corresponding to each light absorbing stripe; and laminating a backing base material (553, 554, 555) with light diffusing and reflecting properties on the face of the lens sheet (511, 512) adjoining the light absorbing portion (530).

37. A process for producing a reflection type screen according to claim 36, wherein a first register mark (531) is formed when the light absorbing portion (530) is printed on the one face of the support sheet (511), a second register mark (532) is formed when the cured resin layer is formed on the other side of the support sheet (511), and registering of the support sheet (511) entering the rotary intaglio (505) is carried out through the register marks (531, 532).

38. An apparatus for producing a reflection type screen, comprising:. a printing device (521, 522) for printing a light absorbing portion (530) with a light absorbing ink (527) on one face of a support sheet (511) of plastic, a dryer (523) for drying the light absorbing portion (530) printed on the one face of the support sheet (511), a rotary intaglio (505) with a surface having a fine convexo-concave pattern in lens form, a press roll (506) for pressing the other face of the support sheet (511) against an outer circumference of the rotary intaglio (505) to wrap the support sheet around the rotary intaglio, a nozzle (516) for filling recess portions (515) of the rotary intaglio (505) with an ionizing radiation curing resin (513), and ionizing radiation irradiating means (508) for irradiating an ionizing radiation toward the support sheet (511) wrapped around the outer circumference of the rotary intaglio (505).

* * * * *